United States Patent
Pechstein et al.

(10) Patent No.: US 12,138,702 B2
(45) Date of Patent: Nov. 12, 2024

(54) PORTABLE PIPE THREADER

(71) Applicant: MILWAUKEE ELECTRIC TOOL CORPORATION, Brookfield, WI (US)

(72) Inventors: Joseph J. Pechstein, West Bend, WI (US); Sean T. Kehoe, Hartland, WI (US); Aaron Grode, Germantown, WI (US); Timothy Hilger, Waterford, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 41 days.

(21) Appl. No.: 17/218,919

(22) Filed: Mar. 31, 2021

(65) Prior Publication Data

US 2021/0229200 A1 Jul. 29, 2021

Related U.S. Application Data

(63) Continuation-in-part of application No. 17/086,755, filed on Nov. 2, 2020.
(Continued)

(51) Int. Cl.
  *B23G 1/24* (2006.01)
  *B23G 1/22* (2006.01)

(52) U.S. Cl.
  CPC ............... *B23G 1/225* (2013.01); *B23G 1/24* (2013.01)

(58) Field of Classification Search
  CPC . B23G 1/24; B23G 1/225; B23G 1/22; B23G 2240/52
  See application file for complete search history.

(56) References Cited

U.S. PATENT DOCUMENTS

| 1,527,185 A | 2/1925 | Hall |
| 1,831,957 A | 11/1931 | Harrison |

(Continued)

FOREIGN PATENT DOCUMENTS

| CN | 101758305 A | 6/2010 |
| CN | 102513618 B | 9/2014 |

(Continued)

OTHER PUBLICATIONS

Ridgid Tools, "Model 535A Automatic Threading Machine," <https://www.ridgid.com/us/en/535a-automatic-threading-machine> web page publicly available at least as early as Nov. 1, 2020.
(Continued)

*Primary Examiner* — Alan Snyder
(74) *Attorney, Agent, or Firm* — Michael Best & Friedrich LLP

(57) ABSTRACT

A portable pipe threader includes a stand upon which a pipe is supported, a carriage supported by the stand upon which at least one pipe threading tool is supported, a spindle including a plurality of chuck jaws for clamping the pipe, the chuck jaws configured to move radially inward along a travel path toward an outer surface of the pipe, and a sensor system configured to determine a location of the chuck jaws along the travel path and relative to the outer surface of the pipe, the sensor system configured to output a signal corresponding to the location of each of the chuck jaws when engaged with the outer surface of the pipe. The portable pipe threader further includes an electronic controller in communication with the sensor system configured to determine an outer diameter of the pipe in response to the signal output from the sensor system.

7 Claims, 22 Drawing Sheets

Related U.S. Application Data

(60) Provisional application No. 63/002,621, filed on Mar. 31, 2020, provisional application No. 62/929,462, filed on Nov. 1, 2019.

(56) References Cited

U.S. PATENT DOCUMENTS

| | | |
|---|---|---|
| 1,956,182 A | 4/1934 | Thewes |
| 1,966,124 A | 7/1934 | Kimlin et al. |
| 1,973,231 A | 9/1934 | Thewes |
| 2,004,639 A | 6/1935 | Thewes |
| 2,076,831 A | 4/1937 | Thewes |
| 2,110,099 A | 3/1938 | Thewes |
| 2,205,148 A | 6/1940 | Mayotte |
| 2,219,721 A | 10/1940 | Ingwer et al. |
| 2,242,954 A | 5/1941 | Ingwer |
| 2,255,009 A | 9/1941 | Ingwer |
| 2,304,027 A | 12/1942 | Sellmeyer |
| 2,350,313 A | 5/1944 | Ingwer et al. |
| 2,374,176 A | 4/1945 | Cook |
| 2,581,702 A | 1/1952 | Quijada |
| 2,591,389 A | 4/1952 | Wallace |
| 2,600,776 A | 6/1952 | Ingwer |
| 2,678,453 A | 5/1954 | Rudolph |
| 2,680,256 A | 6/1954 | Ingwer et al. |
| 2,680,861 A | 6/1954 | Ingwer et al. |
| 2,693,966 A | 11/1954 | Chasar |
| 2,745,670 A | 5/1956 | Janik |
| 2,753,575 A | 7/1956 | Ingwer |
| 2,768,550 A | 10/1956 | Ingwer et al. |
| 2,778,652 A | 1/1957 | Ingwer et al. |
| 2,891,799 A | 6/1959 | Janik |
| 2,916,749 A | 12/1959 | Ingwer et al. |
| 2,996,737 A | 8/1961 | Bjalme |
| 3,002,205 A | 10/1961 | Buyer |
| 3,009,178 A | 11/1961 | Buyer |
| 3,012,792 A | 12/1961 | Bjalme |
| 3,049,737 A | 8/1962 | Weibel |
| 3,082,445 A | 3/1963 | Buyer |
| 3,095,772 A | 7/1963 | Ingwer |
| 3,188,666 A | 6/1965 | Brown, Sr. et al. |
| 3,232,629 A | 2/1966 | Obear |
| 3,270,592 A | 9/1966 | Behnke |
| 3,316,571 A | 5/1967 | Cutrone |
| 3,371,258 A | 2/1968 | Brown |
| 3,398,966 A | 8/1968 | Chalfant et al. |
| 3,413,667 A | 12/1968 | Behnke |
| 3,427,672 A | 2/1969 | Frank |
| 3,456,956 A | 7/1969 | Herbkersman |
| 3,521,313 A | 7/1970 | Baker |
| 3,526,411 A | 9/1970 | Chalfant et al. |
| 3,562,827 A | 2/1971 | Janik |
| 3,610,640 A | 10/1971 | Bollin et al. |
| 3,811,145 A | 5/1974 | Fink |
| 3,864,774 A | 2/1975 | Fohl |
| 3,995,869 A | 12/1976 | Mazingue |
| 4,002,960 A | 1/1977 | Brookfield et al. |
| 4,209,274 A | 6/1980 | Martin et al. |
| 4,213,722 A | 7/1980 | Wagner |
| 4,225,273 A | 9/1980 | Womack |
| 4,247,124 A | 1/1981 | Wagner |
| 4,275,490 A | 6/1981 | Bivins |
| 4,276,490 A | 6/1981 | Saldinger |
| 4,279,182 A | 7/1981 | Miyagawa et al. |
| 4,338,556 A | 7/1982 | Hetzel |
| 4,402,423 A | 9/1983 | Skowronski et al. |
| 4,536,000 A | 8/1985 | Röhm |
| 4,581,783 A | 4/1986 | Hayes et al. |
| 4,606,249 A | 8/1986 | Hayes et al. |
| 4,613,260 A | 9/1986 | Hayes et al. |
| 4,692,071 A | 9/1987 | Hirota |
| 4,752,163 A | 6/1988 | Fedor |
| 4,757,598 A | 7/1988 | Redman |
| 4,787,531 A | 11/1988 | Gress |
| D299,466 S | 1/1989 | Hayes et al. |
| 4,795,175 A | 1/1989 | Babb et al. |
| 4,808,047 A | 2/1989 | Calevich et al. |
| 4,811,639 A | 3/1989 | Gress et al. |
| 4,819,527 A | 4/1989 | Redman |
| 5,002,440 A | 3/1991 | Tamaoki et al. |
| 5,074,176 A | 12/1991 | Redman et al. |
| 5,076,744 A | 12/1991 | Kitagawa et al. |
| 5,087,013 A | 2/1992 | Gress et al. |
| 5,158,404 A | 10/1992 | Samas et al. |
| 5,199,928 A | 4/1993 | Gress et al. |
| 5,560,582 A | 10/1996 | Beelen |
| 5,826,469 A | 10/1998 | Haradem |
| 5,890,852 A | 4/1999 | Gress |
| 6,439,087 B1 | 8/2002 | Haas |
| 6,471,220 B1 | 10/2002 | Babb |
| 7,958,805 B2 | 6/2011 | Rigolone et al. |
| 8,047,923 B2 | 11/2011 | Emerson |
| 9,015,915 B1 | 4/2015 | Soltys et al. |
| 9,095,917 B2 | 8/2015 | Patil et al. |
| 9,138,818 B2 | 9/2015 | Kundracik et al. |
| 9,370,835 B2 | 6/2016 | Kundracik et al. |
| 9,796,033 B2 | 10/2017 | Kundracik et al. |
| 10,016,830 B2 | 7/2018 | Hamm et al. |
| 10,239,140 B2 | 3/2019 | Kundracik et al. |
| 10,668,548 B2 * | 6/2020 | Kundracik ............... B23B 5/08 |
| 2003/0024357 A1 | 2/2003 | Hofmann et al. |
| 2004/0197175 A1 * | 10/2004 | Turner .................... B25F 5/02 |
| | | 429/96 |
| 2008/0210062 A1 | 9/2008 | Nitchman et al. |
| 2009/0248188 A1 | 10/2009 | Haas et al. |
| 2015/0165534 A1 | 6/2015 | Hamm |
| 2017/0021469 A1 | 1/2017 | Sailing |
| 2017/0100791 A1 | 4/2017 | Hamm et al. |
| 2017/0259357 A1 | 9/2017 | Choi |
| 2018/0147713 A1 | 5/2018 | Schmauder et al. |
| 2019/0006980 A1 | 1/2019 | Sheeks et al. |
| 2019/0044110 A1 | 2/2019 | Sheeks et al. |

FOREIGN PATENT DOCUMENTS

| | | |
|---|---|---|
| CN | 204035722 U | 12/2014 |
| CN | 104942382 A | 9/2015 |
| CN | 204770999 U | 11/2015 |
| CN | 105171145 A | 12/2015 |
| CN | 104588792 B | 2/2017 |
| CN | 107378015 A | 11/2017 |
| CN | 107511539 A | 12/2017 |
| CN | 208067512 U | 11/2018 |
| CN | 109773283 A | 5/2019 |
| CN | 209094723 U | 7/2019 |
| CN | 206509598 U | 9/2019 |
| CN | 109226911 B | 2/2020 |
| DE | 1527169 A1 | 7/1969 |
| DE | 1527175 B1 | 12/1970 |
| DE | 20016924 U1 | 12/2000 |
| DE | 102010003807 A1 | 10/2011 |
| EP | 1524058 A2 | 4/2005 |
| EP | 1907172 B1 | 5/2015 |
| EP | 3222379 A1 | 9/2017 |
| EP | 2605879 B1 | 8/2019 |
| EP | 3584027 B1 | 7/2020 |
| JP | 2019048371 A | 3/2019 |
| WO | 2010018409 A2 | 2/2010 |
| WO | 2019006452 A2 | 1/2019 |

OTHER PUBLICATIONS

Teledyne Oster, "Power Threaders," Catalog No. 77, Copyright 1976 (28 pages).

Wheeler Mfg., "Universal Dies/Die Heads are suited for in-place threading," <https://news.thomasnet.com/fullstory/universal-dies-die-heads-are-suited-for-in-place-threading-29007> press release dated Dec. 12, 2003.

International Search Report and Written Opinion for Application No. PCT/US2020/058503 dated Feb. 22, 2021 (11 pages).

International Search Report and Written Opinion for Application No. PCT/US2021/025137 dated Jul. 22, 2021 (12 pages).

(56) References Cited

OTHER PUBLICATIONS

1 Extended European Search Report for Application No. 20882631.3 dated Feb. 29, 2024 (9 pages).
Partial Supplementary European Search Report for Application No. 21780529.0 dated Apr. 30, 2024 (14 pages).

* cited by examiner

PORTABLE PIPE THREADER

CROSS-REFERENCE TO RELATED APPLICATIONS

This application is a continuation-in-part of co-pending U.S. patent Ser. No. 17/086,755 filed on Nov. 2, 2020, which claims priority to U.S. Provisional Patent Application No. 62/929,462 filed on Nov. 1, 2019. This application also claims priority to U.S. Provisional Patent Application No. 63/002,621 filed on Mar. 31, 2020, the entire contents of all of which are incorporated herein by reference.

FIELD OF THE INVENTION

The present invention relates to pipe threaders, and more particularly to portable pipe threaders.

BACKGROUND OF THE INVENTION

Portable pipe threaders include a stand and a carriage mounted to the stand having multiple pipe threading tools. These tools are usually a die holder including multiple dies, a cutter, and a reamer. Typically, a motor transmits torque to a spindle to which a pipe is clamped for rotating the pipe with respect to the tools. The motor is an AC motor that receives power from a remote power source (e.g., via a power cord) and is usually controlled using a pedal, which upon actuation, triggers the motor to begin rotating the pipe. During use, the thread-cutting dies, or other pipe threading tools, heat up and require lubrication. Some portable pipe threaders have an onboard lubrication system to lubricate the dies as the threads are being cut on the pipe, while others rely upon the operator to manually lubricate the dies with a hand-operated pump.

SUMMARY OF THE INVENTION

The present invention provides, in one aspect, a portable pipe threader including a stand upon which a pipe is supported, a carriage supported by the stand upon which at least one pipe threading tool is supported, a spindle including a plurality of chuck jaws for clamping the pipe, the chuck jaws configured to move radially inward along a travel path toward an outer surface of the pipe, and a sensor system configured to determine a location of the chuck jaws along the travel path and relative to the outer surface of the pipe, the sensor system configured to output a signal corresponding to the location of each of the chuck jaws when engaged with the outer surface of the pipe. The portable pipe threader further includes an electronic controller in communication with the sensor system configured to determine an outer diameter of the pipe in response to the signal output from the sensor system.

The present invention provides, in another aspect, a stand upon which a pipe is supported, a carriage supported by the stand upon which at least one pipe threading tool is supported, a drive assembly mounted to the stand including an electric motor operable to provide torque to the pipe, and a lift-assist mechanism coupled to the stand. The stand is foldable about a pivot axis between a collapsed state and a deployed state, and the lift-assist mechanism is configured to apply a moment to the stand about the pivot axis during adjustment from the collapsed state to the deployed state.

The present invention provides, in yet another aspect, a portable pipe threader including a stand upon which a pipe is supported, a carriage supported by the stand, a spindle including a plurality of chuck jaws for clamping the pipe, the chuck jaws configured to move radially inward toward an outer surface of the pipe, and a drive assembly mounted to the stand including an electric motor selectively operable to provide torque to the pipe, causing it to rotate, and the spindle to tighten the chuck jaws onto the outer surface of the pipe.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
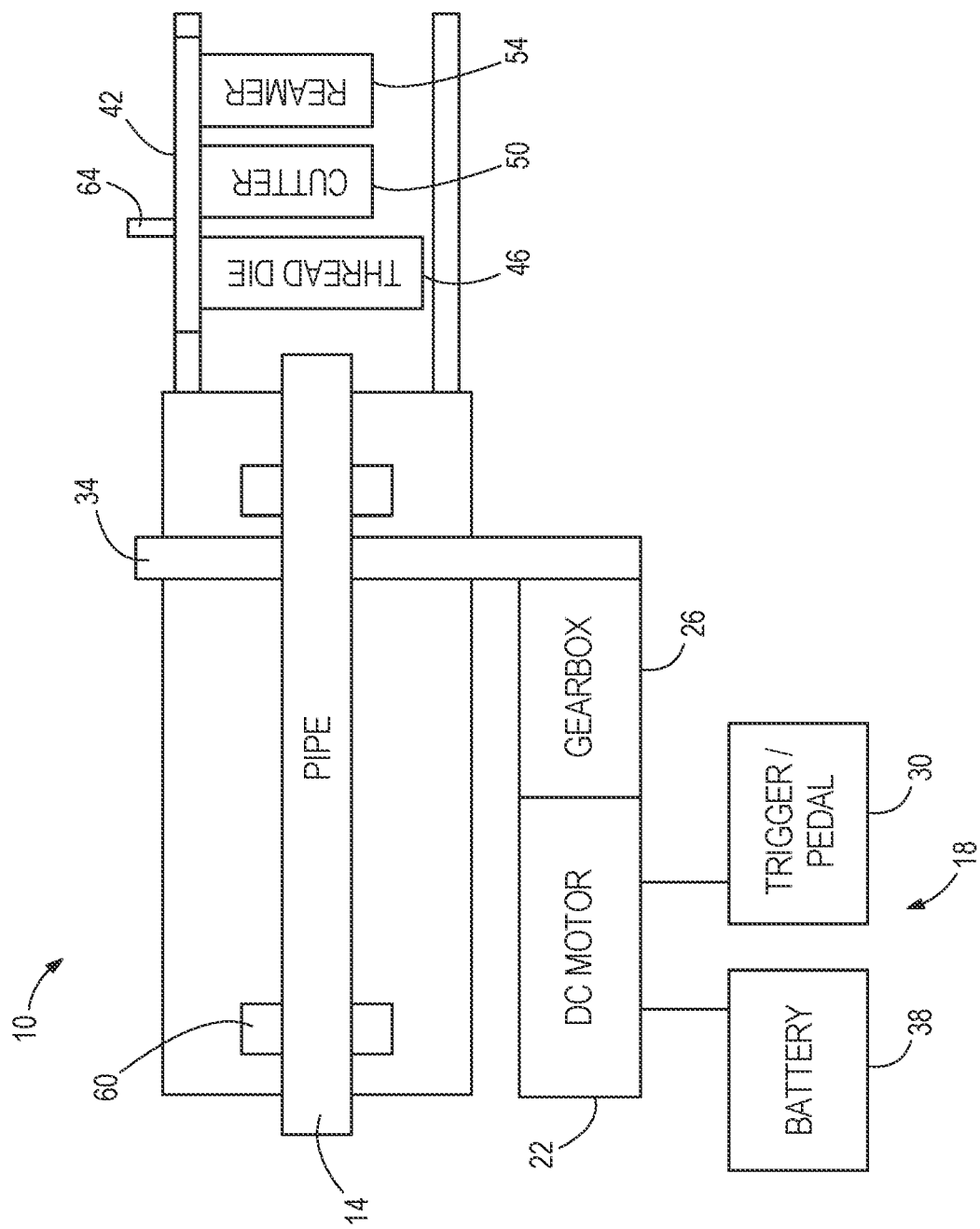
FIG. 1 is a top view of a portable pipe threader in accordance with an embodiment of the invention.

With reference to FIG. 1, a portable pipe threader 10 includes a stand 68 (FIG. 5) and a carriage 42 supported by the stand 68 having a plurality of pipe threading tools 46, 50, 54 supported by the carriage 42. The pipe threader 10 further includes a drive assembly 18 mounted to the stand 68 having a motor 22 (e.g. a brushless direct current motor), a gear box 26 coupled to the motor 22 having an output gear (not shown), and an electronic speed selection switch, such as a pedal 30, that selectively controls the drive assembly 18. The drive assembly 18 is powered by a battery pack 38 supported by the stand 68 in selective electrical communication with the motor 22 to provide electrical power to the motor 22. In some constructions, the battery pack 38 and the motor 22 can be configured as an 18 Volt high power battery pack and motor, such as the 18 Volt high power system disclosed in U.S. patent application Ser. No. 16/045,513 filed on Jul. 25, 2018 (now U.S. Patent Application Publication No. 2019/0044110), the entirety of which is incorporated herein by reference. In other constructions, the battery pack 38 and the motor 22 can be configured as an 80 Volt high power battery pack and motor, such as the 80 Volt battery pack and motor disclosed in U.S. patent application Ser. No. 16/025,491 filed on Jul. 2, 2018 (now U.S. Patent Application Publication No. 2019/0006980), the entirety of which is incorporated herein by reference. In such a battery pack 38, the battery cells within the battery pack 38 have a nominal voltage of up to about 80 V. In some embodiments, the battery pack 38 has a weight of up to about 6 lb. In some embodiments, each of the battery cells has a diameter of up to 21 mm and a length of up to about 71 mm. In some embodiments, the battery pack 38 includes up to twenty battery cells. In some embodiments, the battery cells 38 are connected in series. In some embodiments, the battery cells are operable to output a sustained operating discharge current of between about 40 A and about 60 A. In some embodiments, each of the battery cells has a capacity of between about 3.0 Ah and about 5.0 Ah. And, in some embodiments of the motor 22 when used with the 80 Volt battery pack 38, the motor 22 has a power output of at least about 2760 W and a nominal outer diameter (measured at the stator) of up to about 80 mm.

With reference to FIG. 1, the drive assembly 18 further includes a drive element 34 (e.g., a belt) coupled to the gear box 26 and powered by the motor 22. The motor 22 is configured to supply torque to the output gear of the gear box 26, rotatably driving the drive element 34 to rotate a pipe 14 or a selected one of the plurality of pipe threading tools. The pedal 30 is operable to activate the motor 22 and control a relative speed at which the pipe 14 rotates. In other embodiments, the relative speed at which the pipe 14 rotates can be selected using an electronic speed selection switch other than the pedal 30 (e.g., dial, key pad, button, etc.; not shown).

Figure 4:
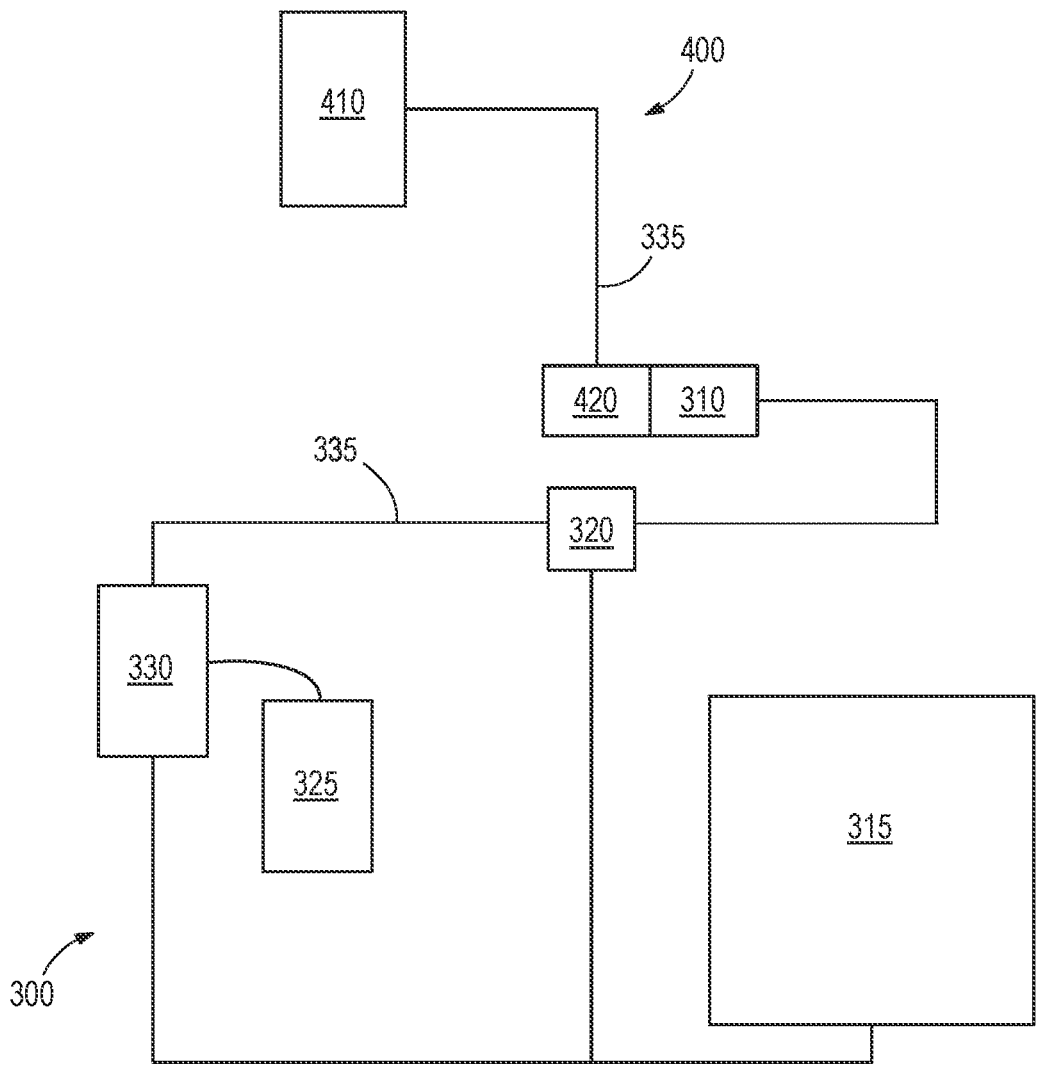
FIG. 4 is a schematic view of a lubrication system for use with any of the portable pipe threaders of FIGS. 1-3.
Figure 5:
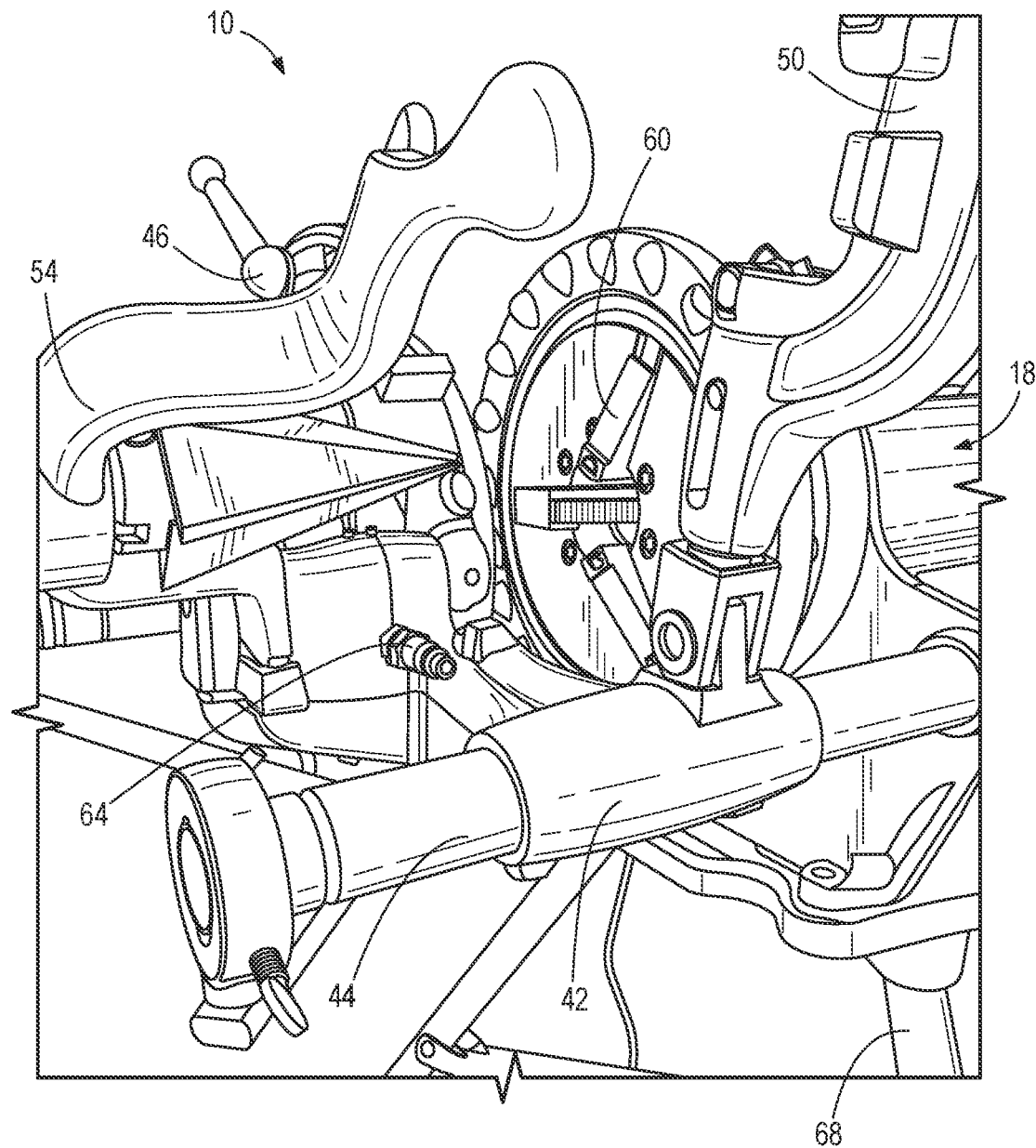
FIG. 5 is a perspective view of one of the pipe threaders of FIGS. 1-3 including a male quick-connect coupling to which a corresponding female quick-connect coupling of the lubrication system of FIG. 4 may be connected.

With reference to FIGS. 1 and 5, the portable pipe threader 10 further includes a spindle 60 in which the pipe 14 is clamped. The drive element 34 interconnects the spindle 60 and the output gear of the gear box 26. Thus, torque from the motor 22 is transferred to the spindle 60, causing it and the pipe 14 to rotate, via the gear box 26 and the drive element 34. With reference to FIG. 1, the plurality of pipe threading tools 46, 50, 54 includes a die holder 46 having a plurality of dies (not shown) to cut threads on the pipe 14, a cutter 50 to trim excess pipe 14, and a reamer 54 to smooth edges of the threaded or cut pipe 14. The plurality of pipe threading tools 46, 50, 54 remain stationary on the carriage 42 while the pipe 14 is rotated by the spindle 60. The portable pipe threader 10 also includes a lubricant port 64 (e.g., a male quick-connect coupling) configured to fluidly connect to a lubrication system 300 (FIG. 4) to provide lubricant during a threading, cutting, or reaming operation using, respectively, the die holder 46, the cutter 50, or the reamer 54.

Figure 2:
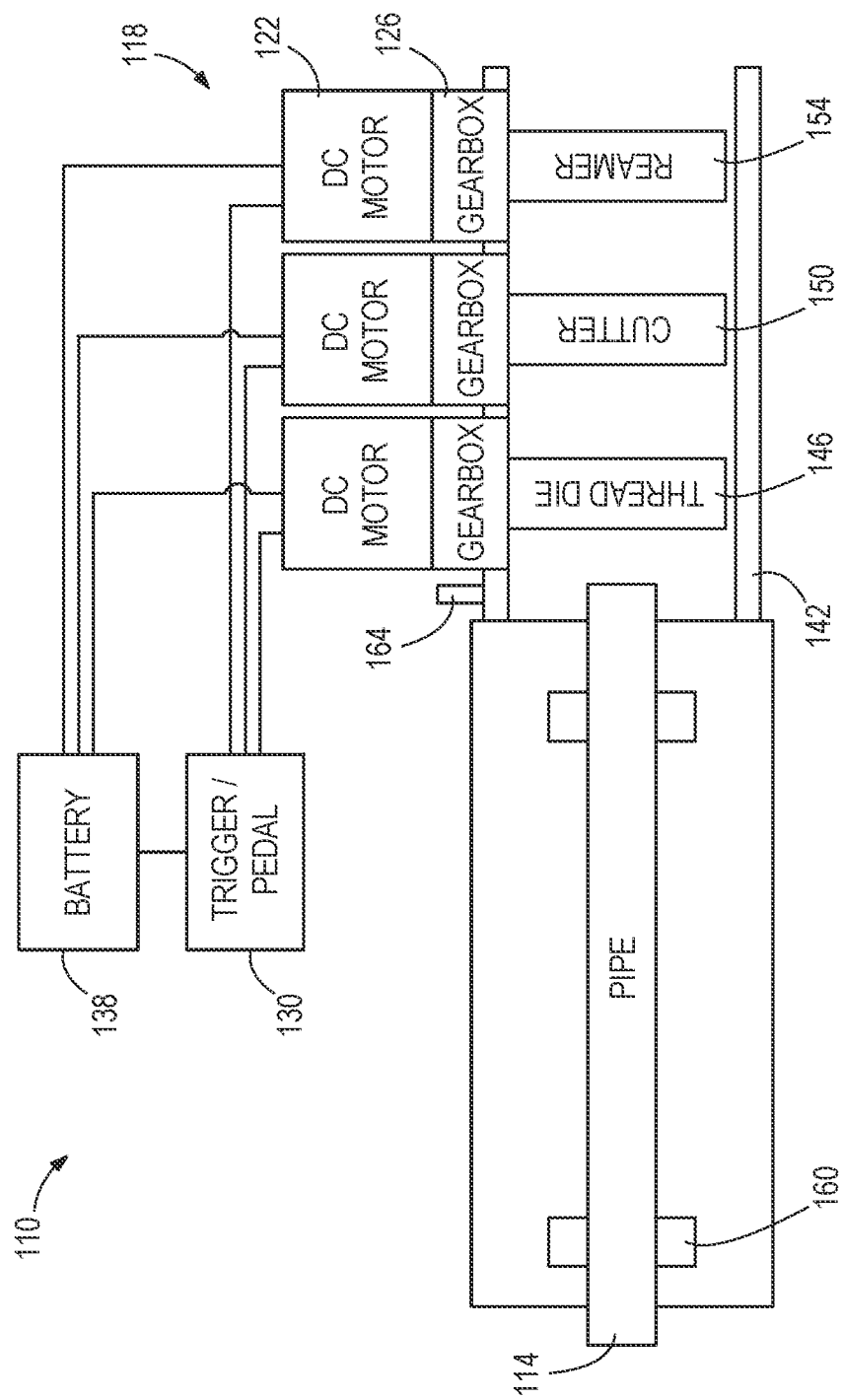
FIG. 2 is a top view of a portable pipe threader in accordance with another embodiment of the invention.

FIG. 2 illustrates a portable pipe threader 110 according to an alternative embodiment. Like components and features as the pipe threader 10 of FIG. 1 will be used plus "100". The portable pipe threader 110 includes a stand 68 (FIG. 5) and a carriage 142 supported by the stand 68. The pipe threader 110 includes a spindle 160 to which a pipe 114 is clamped and a plurality of pipe threading tools 146, 150, 154 supported by the carriage 142. However, rather than the spindle 160 being rotated, the pipe threader 110 includes a drive assembly 118 mounted to the carriage 142 with the pipe threading tools 146, 150, 154 for rotating the individual tools 146, 150, 154.

More specifically, the drive assembly 118 includes a plurality of motors 122, each having a corresponding gear box 126, to directly provide torque to each of the plurality of pipe threading tools 146, 150, 154 to rotate the tools 146, 150, 154 relative to the stationary pipe 160. The pipe threader 110 further includes a pedal 130 to selectively control the drive assembly 118. In particular, the pedal 130 is operable to activate any of the motors 122 and control a relative speed at which the pipe 114 and the selected one of the pipe threading tools 146, 150, 154 are rotated. The pipe threader also includes a battery pack 138 supported by the stand 68 (FIG. 5) in selective electrical communication with each of the motors 122 to provide electrical power thereto.

Figure 3:
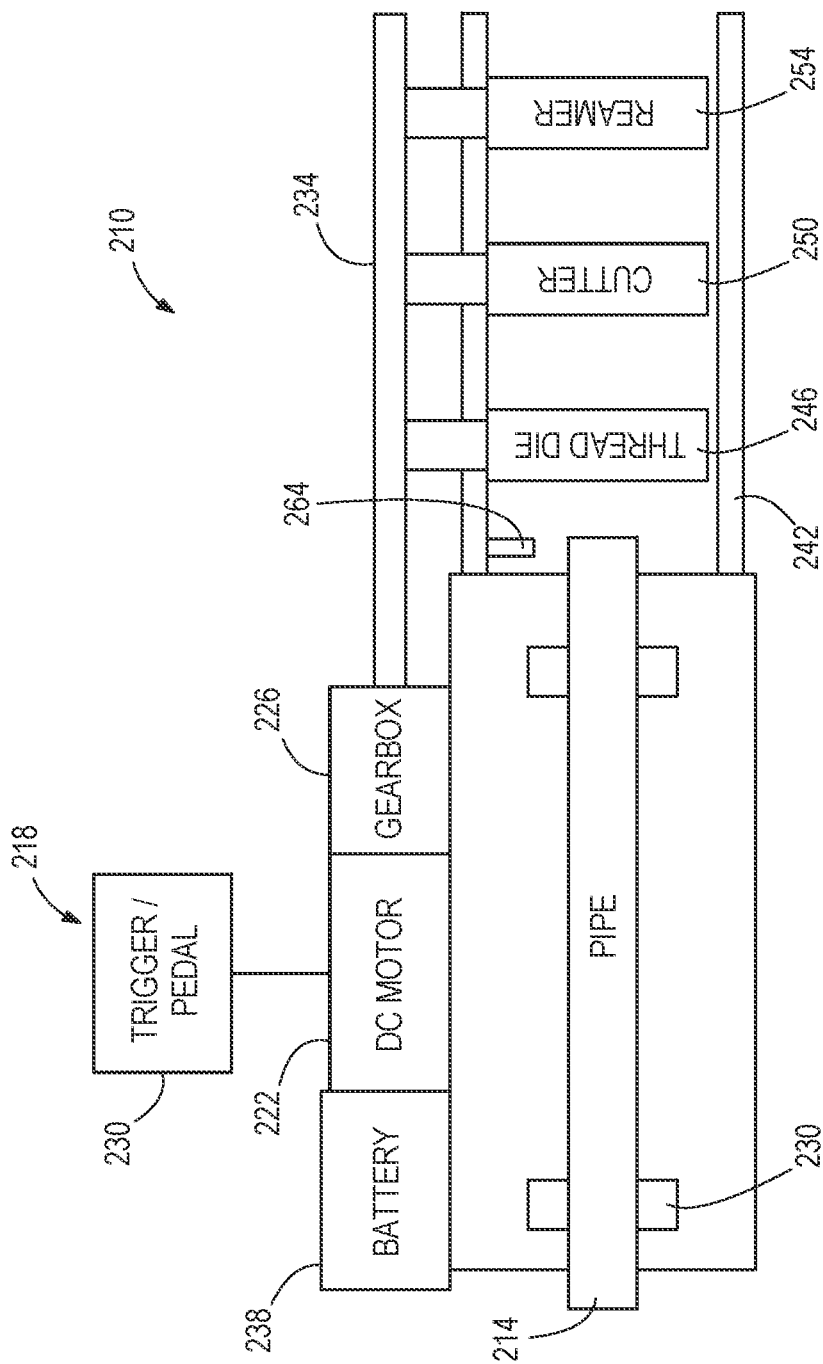
FIG. 3 is a top view of a portable pipe threader in accordance with yet another embodiment of the invention.

FIG. 3 illustrates a portable pipe threader 210 according to an alternative embodiment. Like components and features as the pipe threader 10 of FIG. 1 will be used plus "200". The portable pipe threader 210 includes a stand 68 (FIG. 5) and a carriage 242 supported by the stand 68. The pipe threader 210 includes a spindle 260 to which a pipe 214 is clamped and a plurality of pipe threading tools 246, 250, 256 supported by the carriage 242. However, rather than the spindle 260 being rotated, the pipe threader 210 includes a drive assembly 218 mounted to the stand 68 for selectively rotating one of the pipe threading tools 246, 250, 256.

More specifically, the drive assembly 218 includes a motor 222, a gear box 226 coupled to the motor having an output gear (not shown), a pedal 230 that selectively controls the drive assembly 218, and a battery pack 238 supported by the stand 68 in selective electrical communication with the motor 222 to provide electrical power to the motor 222. The drive assembly 218 further includes a common driveline 234 interconnecting the motor 222 and the plurality of pipe threading tools 246, 250, 254 for selectively providing torque from the motor 222 to one of the pipe threading tools 246, 250, 254. The pedal 230 is operable to activate the motor 222 and control a relative speed at which the pipe 214 and the selected one of the pipe threading tools 246, 250, 254 are rotated.

With reference to FIGS. 1 and 4, the lubricant ports 64, 164, 264 of any of the pipe threaders 10, 110, 210 shown in FIGS. 1-3 are configured to fluidly connect to a lubrication system 300 to receive lubricant therefrom. In some embodiments, the lubrication system 300 is separate and detachable from the threader 10. And, in other embodiments, the lubrication system 300 is integrated with the threader 10. As shown in FIG. 4, the lubrication system 300 includes a pump 330 (e.g. self-priming positive displacement) that draws lubricant from a tank 315 through a plurality of tubes 335. A battery pack 325, which is separate from any of the battery packs 38, 138, 238, provides electrical power to the pump 330. In other embodiments of the lubrication system 300, the pump 330 may receive electrical power from the same battery packs 38, 138, 238 powering the electric motors 22, 122, 222, respectively. The lubrication system 300 also includes a connector 310 (e.g., a female quick-disconnect coupling) downstream of the pump 330 to receive pressurized lubricant therefrom and a regulator valve 320 having an inlet in fluid communication with the tube 335 interconnecting the pump 330 and the connector 310, and an outlet in fluid communication with the tube 335 interconnecting the tank 315 and the pump 330. As such, during operation of the pump 330, the regulator 320 limits the flow of pressurized lubricant sent to the connector 310 by recirculating some of the pressurized lubricant to the inlet of the pump 330. As explained in further detail below, the connector 310 can fluidly connect the lubrication system 300 to either a hand-held lubrication system 400 (FIG. 4) or any of the lubricant ports 64, 164, 264 on the respective pipe threaders 10, 110, 210.

With continued reference to FIGS. 1 and 4, the hand-held lubrication system 400 includes a hand-operated pump 410 configured to apply lubricant to the pipe 14 (FIG. 1) as it is threaded, cut, or reamed, and a connector 420 (e.g., a male quick-connect coupling) capable of fluidly connecting to the corresponding connector 310 of the lubrication system 300 (FIG. 4). In this manner, the hand-operated pump 410 can be used to draw lubricant from the tank 315 while bypassing the pump 330. The hand-operated pump 410 can be used, for example, by an operator of the pipe threader 10 desiring manual control over when and where lubricant is provided to the pipe during a threading, cutting, or reaming operation. Alternatively, if the operator desires lubricant to be automatically applied to the pipe, the connector 310 of the lubrication system 300 can be attached to any of the connectors 64, 164, 264 of the respective pipe threaders 10, 110, 210, in which case the pump 330 is operated to provide pressurized lubricant to the pipe threaders 10, 110, 210 for discharge to the pipe through internal passageways in the pipe threaders 10, 110, 210. In other embodiments, the pump 330 may be used to provide a pressurized flow of lubricant to the pump 410, which could be used as a hand-held dispenser by the operator of the threader 10 to start and stop the flow of the lubricant, to manually direct the lubricant discharged from the pump 330 to the pipe.

Figure 6:
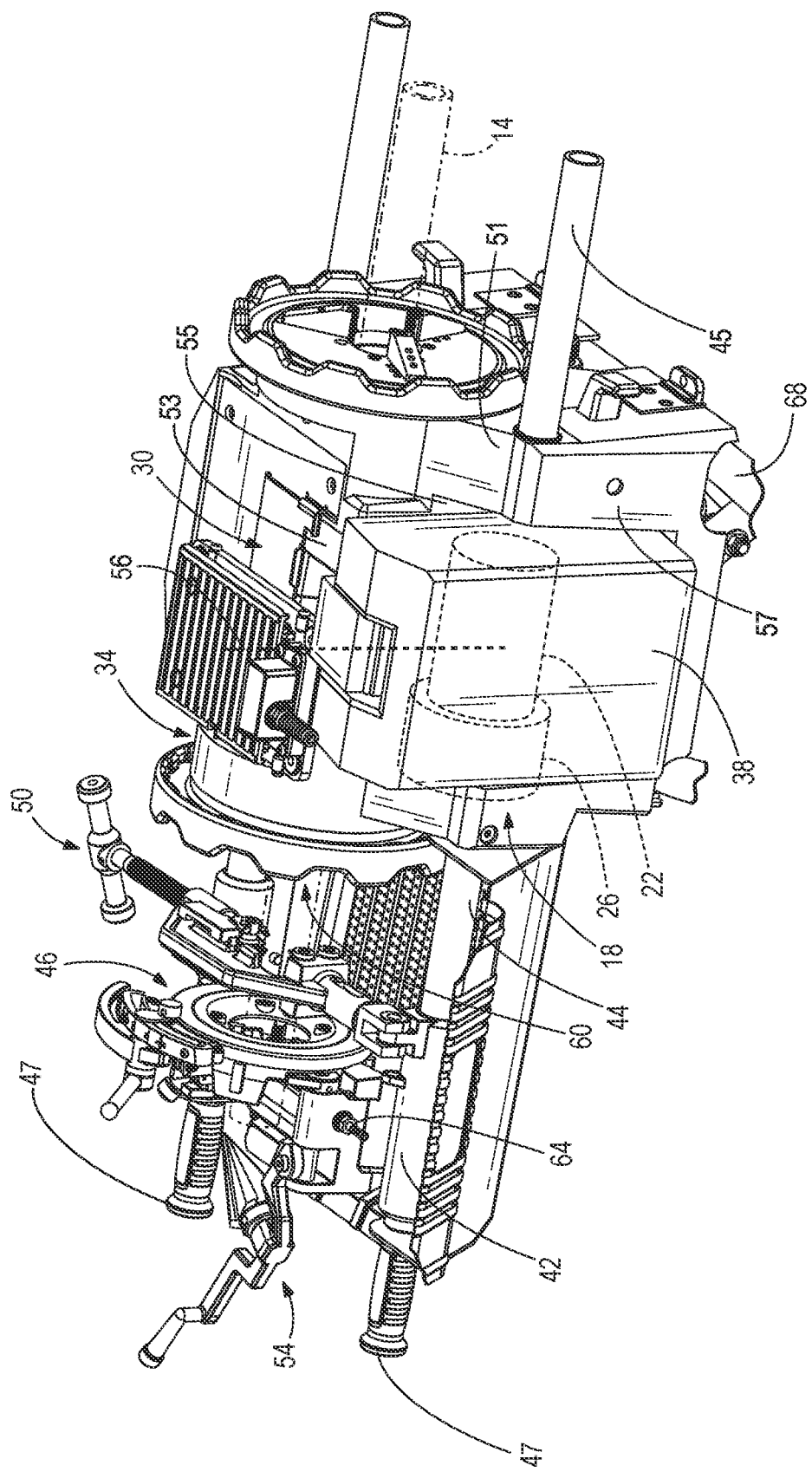
FIG. 6 is a perspective view of the pipe threader of FIG. 1.

With reference to FIG. 6, the pipe threader 10 includes a housing 51 in which the drive assembly 18 is located, a first set of guide rails 44 extending from a first end of the housing 51 in a first direction, and a second set of guide rails 45 extending from an opposite, second end of the housing 51 in a second direction. The first set of guide rails 44 are configured to support the carriage 42, which is slidable along the rails 44 to position the pipe threading tools 46, 50, 54 relative to the pipe 14. The housing 51 further includes a battery receptacle 53 recessed within the housing 51 and located on a side 57 of the housing 51 that is oriented parallel with the first and second set of guide rails 44, 45. The recessed battery receptacle 53 coincides with a gap 55 defined by the housing 51 between the first and second sets of guide rails 44, 45. The battery receptacle 53 defines a battery insertion axis 56 transverse to the first and second sets of guide rails 44, 45 along which the battery pack 38 is slidably received to electrically power the motor 22. When the battery pack 38 is connected to the battery receptacle 53, the battery pack 38 is partially recessed within the housing 51 and located within the gap 55 between the first and second sets of guide rails 44, 45.

With continued reference to FIG. 6, the guide rails 44 are selectively extendable from the carriage 42 and each include a guide handle 47 allowing the user to either extend one or both of the rails 44. Furthermore, the handles 47 allow the user to grip the threader 10 when transporting the threader on the stand 1200 (FIG. 18).

In some embodiments of the pipe threader 10, the carriage 42 can alternatively be supported on the second set of guide rails 45 and slidable in the second direction.

Figure 7:
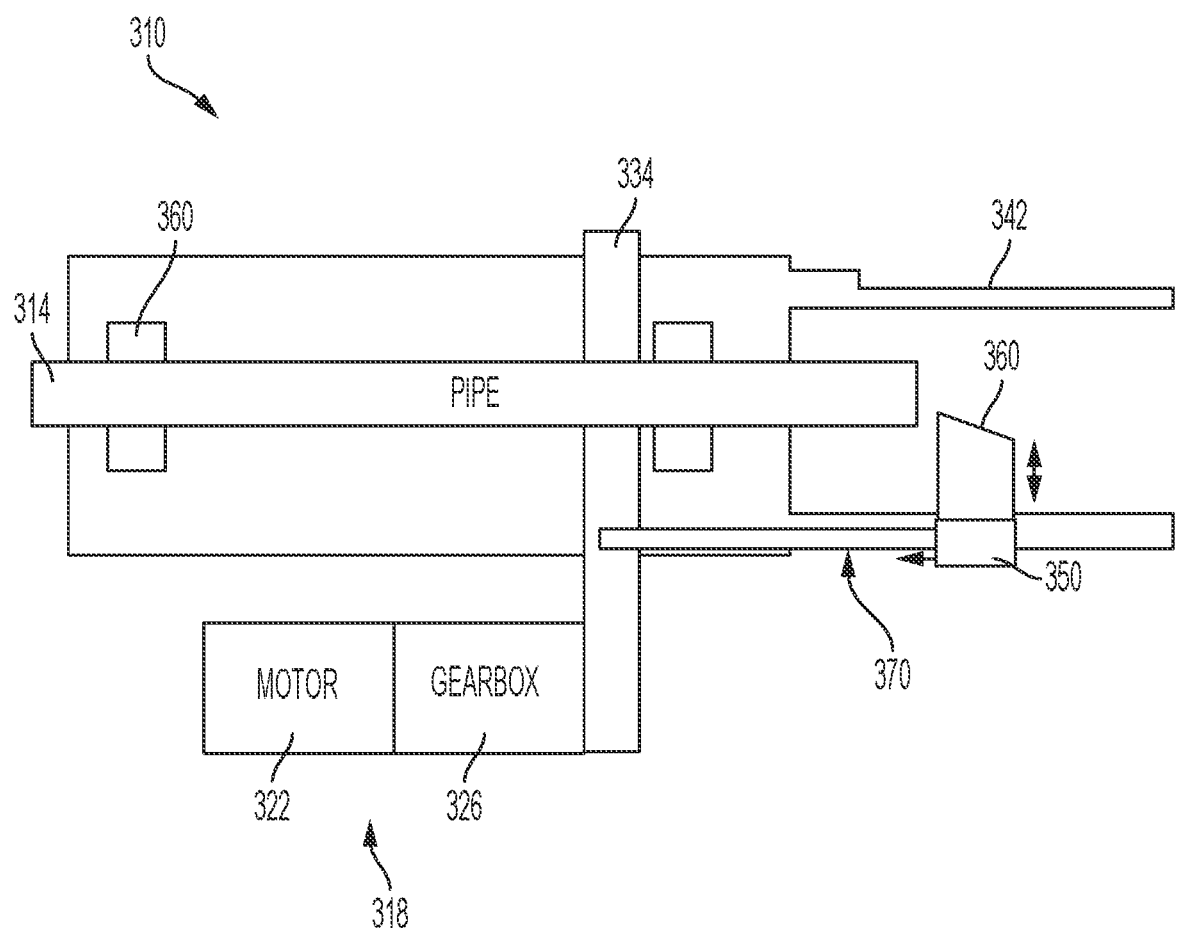
FIG. 7 is a top view of a portable pipe threader in accordance with another embodiment of the invention.

FIG. 7 illustrates a portable pipe threader 310 according to an alternative embodiment. Like components and features as the pipe threader 10 of FIG. 1 will be used plus "300". The portable pipe threader 310 includes a stand 68 (FIG. 6) and a carriage 342 supported by the stand 68. The pipe threader 310 includes a spindle 360 to which a pipe 314 is clamped and an axial feed track 370 supported by the carriage 342 having a boom 350 with a cutting tool 360. The boom 350 is configured to move the cutting tool 360 along the axial feed track 370 at a specific rate, thereby interacting with the pipe 314 to perform a cutting operation in response to a user selected tapered thread having a particular pitch and depth. The cutting tool 360 can move in a first direction parallel with the pipe 314 along the axial feed track 370 on the carriage 342, and in a second direction perpendicular to the pipe 314. By having the boom 350 capable of moving in the first direction and the second direction, the user is able to form the tapered thread on the pipe 314, as well as accommodate different sizes of pipe 314. To move the cutting tool 360 in the first and second directions, the boom 350 can include a mechanical system or a servo system (not shown) to control the speed and direction of the boom 350 and cutting tool 360.

In some embodiments of the portable pipe threader 310, the axial feed track 370 can utilize a lead screw, a rack and pinion, or a belt, for example, to control the rate the boom 350 moves the cutting tool 360 along the carriage 342.

In operation, the user would slide the cutting tool 360 to the end of the pipe 314 via the boom 350 and position the cutting tool 360 at a selected distance from the center of the pipe 314. The user would then operate the axial feed track 370 to move the cutting tool 360 at a desired rate to form a thread, or the tapered thread.

With continued reference to FIG. 7, the pipe threader 310 further includes a drive assembly 318 having a motor 322, a gear box 326 coupled to the motor 322 having an output gear (not shown), and a drive element 334 coupled to the gear box 326 and powered by the motor 322. The motor 322 is configured to supply torque to the output gear of the gear box 326, rotatably driving the drive element 334 to rotate the pipe 314.

Figure 8:
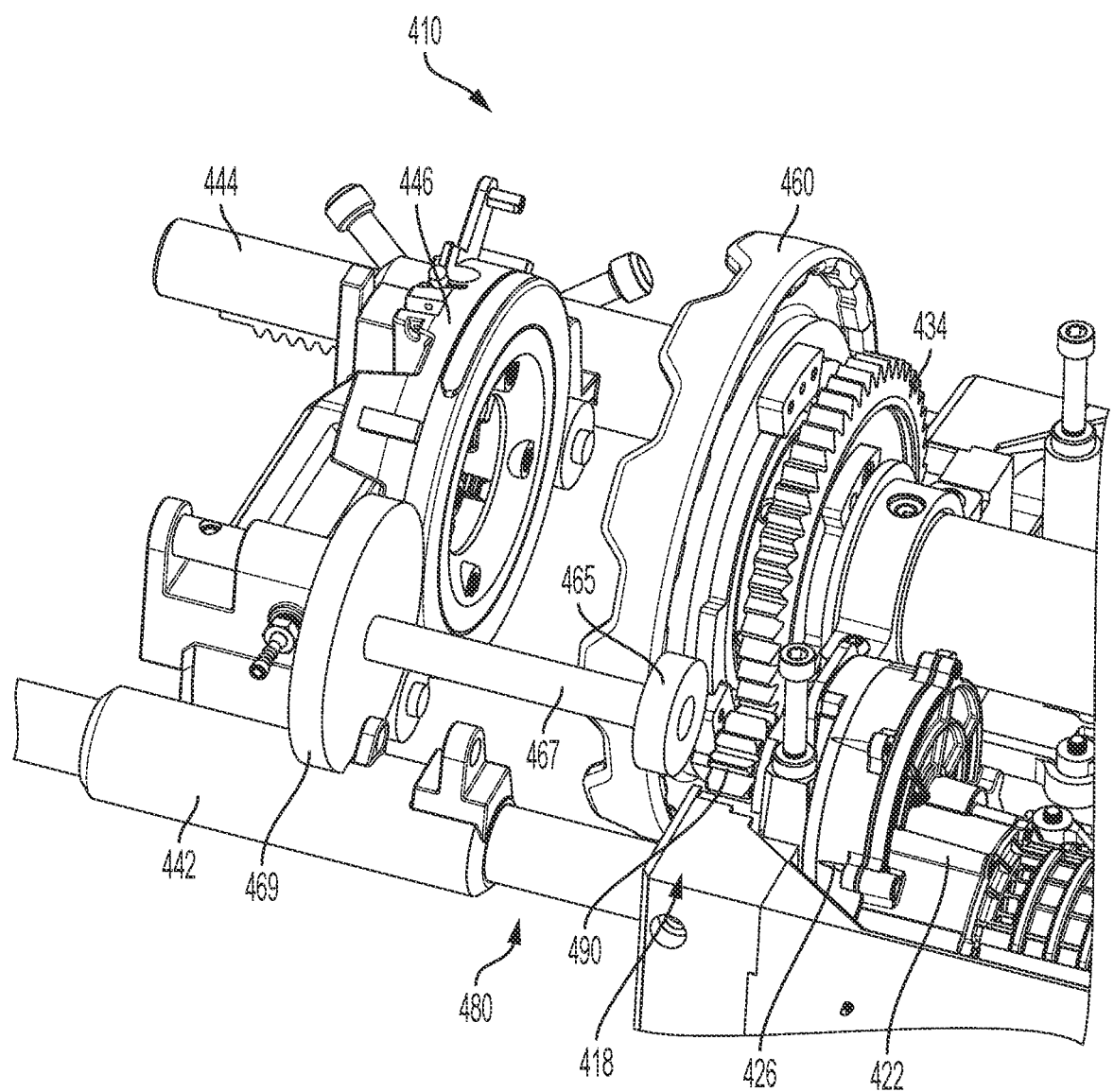
FIG. 8 is a perspective view of an embodiment of a multi-mode gear arrangement for use with any of the portable pipe threaders of FIGS. 1-3.

FIG. 8 illustrates a portable threader 410 according to alternative embodiments, including a multi-mode gear arrangement 480. Like components and features as the pipe threader 10 of FIG. 1 will be used plus "400" for the threader 410. FIG. 8 illustrates the portable threader 410 including a carriage 442 supported by the first set of guide rails 444. The portable pipe threader 410 further includes a spindle 460 to which a pipe (not shown) is clamped. The pipe threader 410 further includes a drive assembly 418 with a motor 422 for driving the multi-mode gear arrangement 480. The drive assembly 418 further includes a gear box 426 coupled to the motor 422 having an output drive gear 490, which, in a first position, is engaged with a drive element 434 for rotatably driving the spindle 460, or in a second position, is engaged with the gear arrangement 480. The gear arrangement 480 is mounted to the carriage 442 and includes a shaft 467 rotatably supporting a die head input gear 465 in selective engagement with the drive gear 490, and a die head drive gear 469 opposite the input gear 465 for rotatably driving the die head 446. In operation, the multi-mode gear arrangement 480 allows the user actuate a rod or handle (not shown) to move the drive gear 490 between the first position to selectively rotate the pipe with respect to the die head 446 and the second position, alternatively coupling the drive gear 490 to the die head input gear 465 to rotatably drive the die head drive gear 469 to rotate the die head 446 with respect to the pipe.

In other embodiments of the pipe threader 410, the cutting die 446 can be the pipe cutter 50, 150, 250, or reamer 54, 154, 254, of the respective threaders 10, 110, 210.

Figure 9:
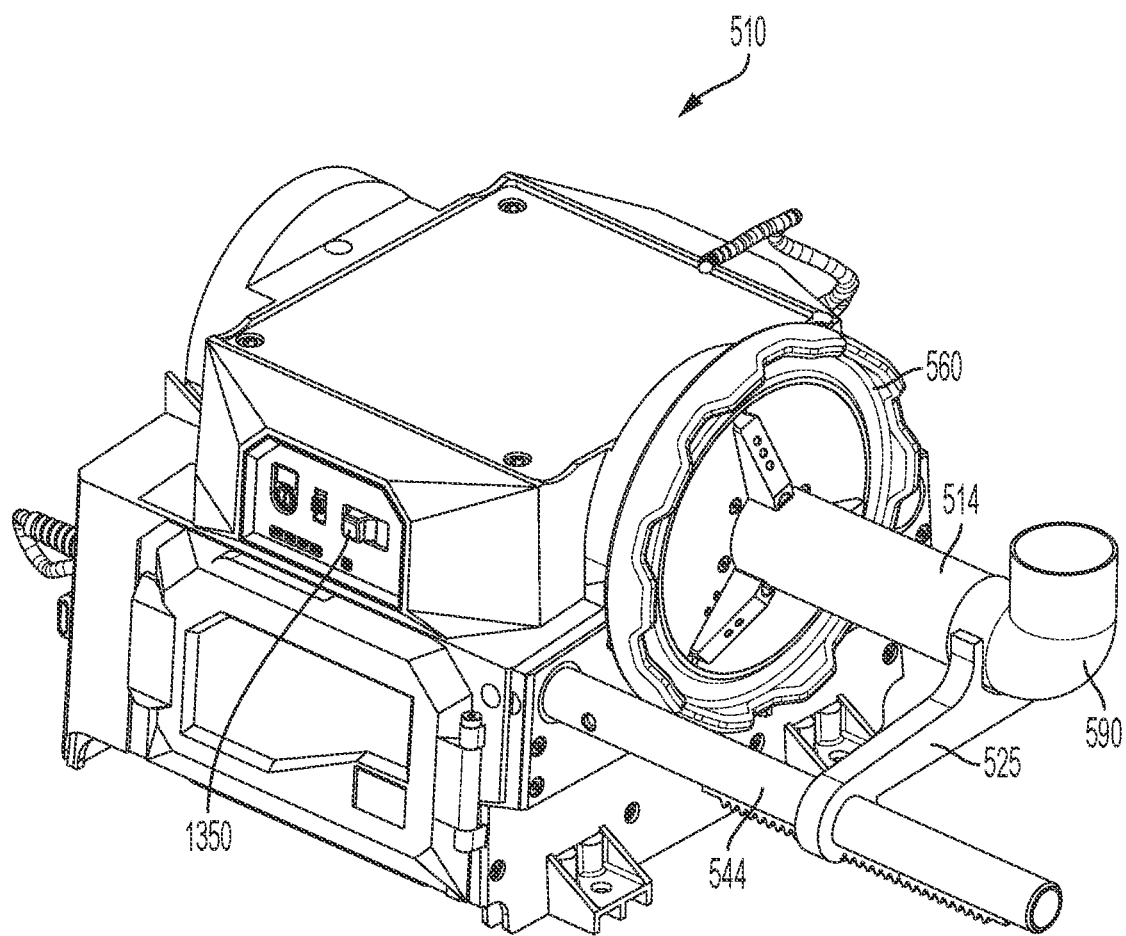
FIG. 9 is a perspective view of a portable pipe threader in accordance with another embodiment of the invention.

FIG. 9 illustrates a portable pipe threader 510 according to an alternative embodiment. Like components and features as the pipe threader 10 of FIG. 1 will be used plus "500". The portable pipe threader 510 includes a spindle 560, a pipe 514, a motor (not shown) for rotationally driving the spindle 560 to rotate the pipe 514 and a first set of guide rails 544 for supporting a pipe wrench 525. The pipe wrench 525 is configured to hold a pipe fitting 590 against the end of the pipe 514. In operation, the pipe wrench 550 holds the fitting 550 stationary while the motor spins the pipe 514, thereby threading the pipe 514 onto the fitting 550.

In some embodiments of the portable pipe threader 510, the pipe 514 can be held stationary and the fitting 590 can be rotated onto the pipe 514. In other embodiments of the portable pipe threader 510, the pipe wrench 525 could be integrated into the cutter 50, 150, 250 or reamer 54, 154, 254 of the threaders 10, 110, 210.

Figure 10A:
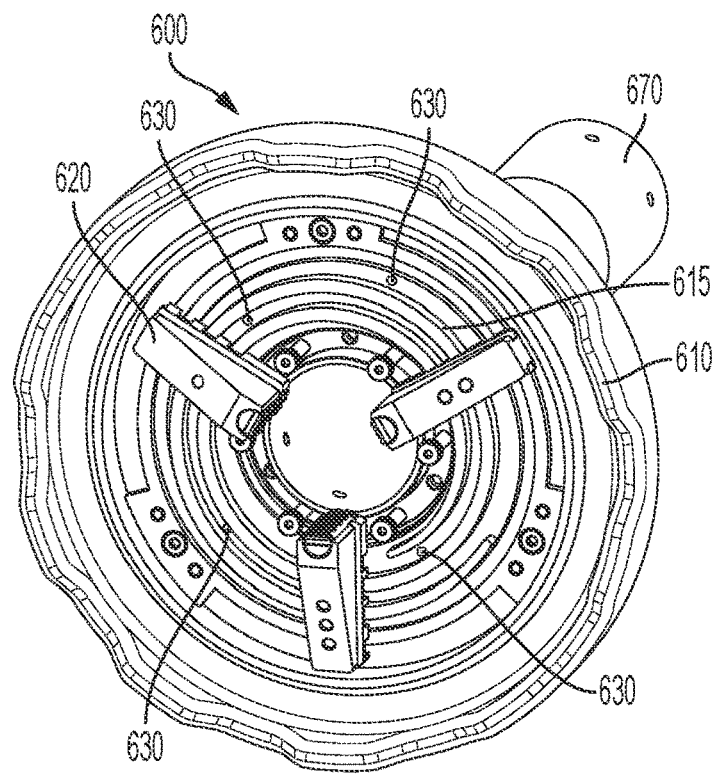
FIGS. 10A-10D are perspective views of a chuck sensing system for use with any of the portable pipe threaders of FIGS. 1-3.

FIGS. 10A-10D illustrate different embodiments of a chuck sensing system 600 that can be incorporated into the spindle 60, 160, 260, 360 of the portable threaders 10, 110, 210, 310. FIG. 10A illustrates a front view of the chuck sensing system 600 that includes an adjustable chuck 610 having a plurality of chuck jaws 620 configured to be tightened down on a pipe 14, 114, 214, 314 rotatably held in a drive tube 670, a tightening plate 615 defining a path for the chuck jaws 620 to travel, and a plurality of discrete proximity sensors 630 integrated into the tightening plate 615 along the travel path of the chuck jaws 620. As the chuck jaws 620 move toward the outer diameter of the pipe along the travel path, the chuck jaws 620 progressively cover the sensors 630, causing the sensors 630 to output a signal or switch states. The signal is received by an electronic controller 1450 (FIG. 19) to indicate the detected position of the chuck jaws 620. And, knowing the detected position of the chuck jaws 620, the system 600 can determine a nominal measurement of an outer diameter of the pipe.

Figure 10B:
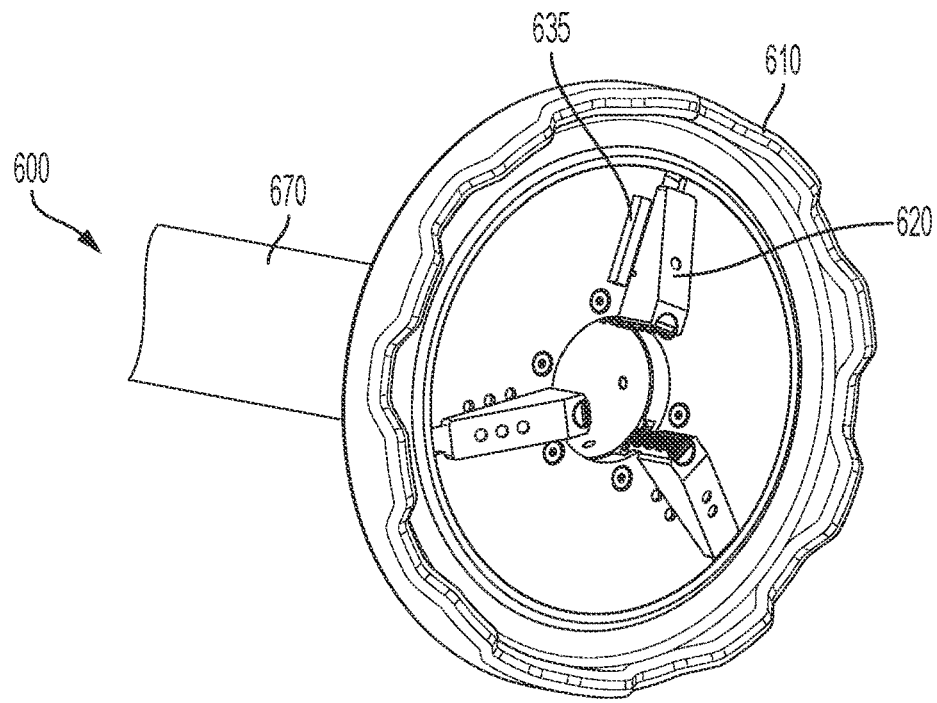

FIG. 10B illustrates an alternative embodiment of the chuck sensing system 600 including a linear potentiometer 635, instead of discrete proximity sensors 630, positioned at the outermost radial position of the travel path of the chuck jaws 620. In operation, the user inserts the pipe into the chuck 610 and rotates the chuck 610 until the chuck jaws 620 contact the outer diameter of the pipe. As the chuck jaws 620 move radially inward, the signal output by the linear potentiometer changes. The signal is received by an electronic controller 1450 (FIG. 19), which then extrapolates the position of the chuck jaws 620, and therefore the nominal outer diameter of the pipe.

Figure 10C:
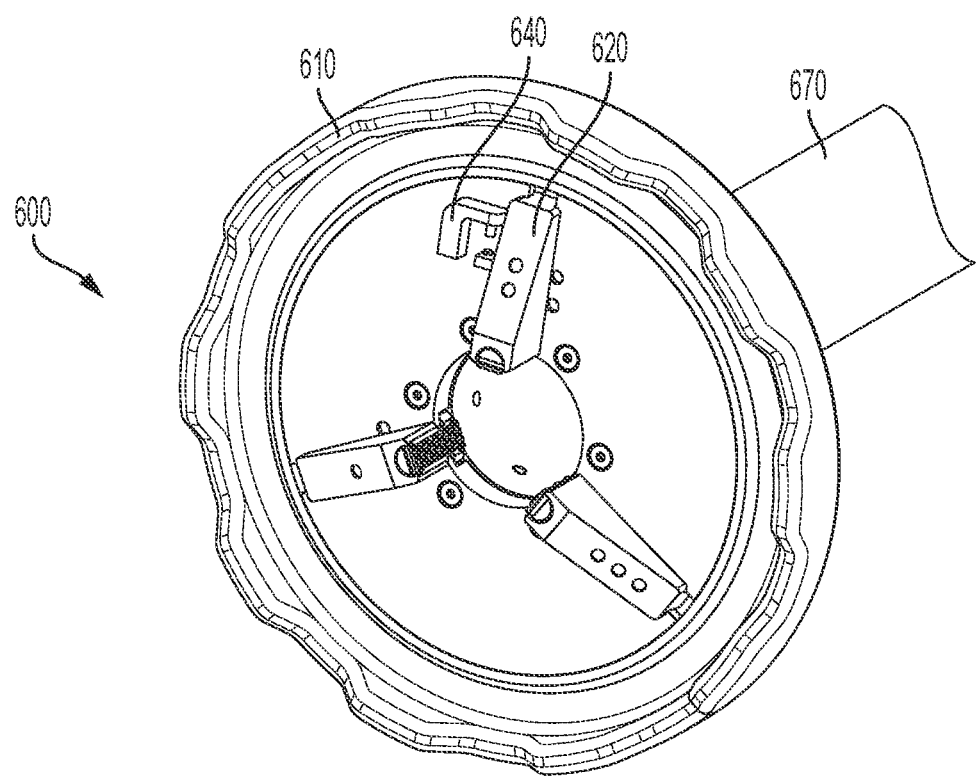

FIG. 10C illustrates another alternate embodiment of the chuck sensing system 600 including a proximity sensor 640 for electrically communicating with the plurality of chuck jaws 620. In operation, the proximity sensor 640 (e.g., an infrared or Hall-effect sensor) measure a radial distance of the chuck jaws 320 depending on their relative location along the travel path on the tightening plate 615 (FIG. 10A) until the chuck jaws 620 contact the outer diameter of the pipe. Once the chuck jaws 620 contact the outer diameter of the pipe, the proximity sensor 640 outputs a signal of the distance measurement to the electronic controller 1450 (FIG. 19A), which then extrapolates the position of the chuck jaws 620, and therefore the nominal outer diameter of the pipe.

Figure 10D:
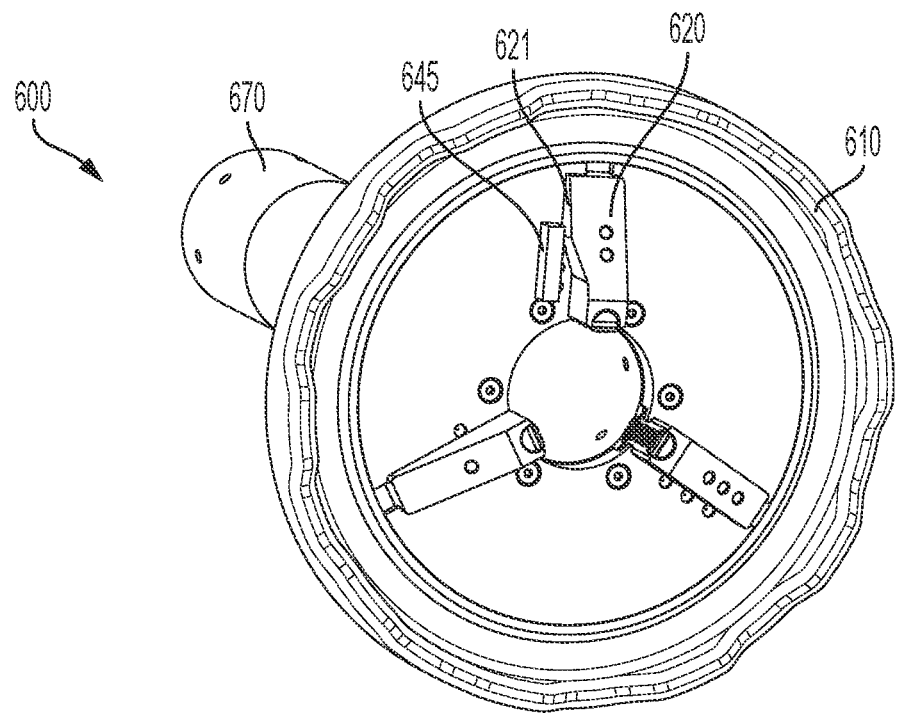

FIG. 10D illustrates yet another alternate embodiment of the chuck sensing system 600 including a series of electrical switches 645 configured to be selectively depressed by an outer edge portion 621 integrated into one of the chuck jaws 620. In operation, as the chuck jaws 620 travel along the travel path on the tightening plate 615 (FIG. 10A), the outer edge portion 621 on one of the chuck jaws 620 will selectively depress one of the switches 645 until the chuck jaws 320 contact the outer diameter of the pipe. Once the chuck jaws 620 contact the outer diameter of the pipe, the electronic controller 1450 is able to determine an estimated nominal size of the pipe's outer diameter based on which one of the switches 645 is depressed by the outer edge portion 621 on one of the chuck jaws 620.

In other embodiments of the chuck sensing system 600, the sensors 630 can work in conjunction with the electrical switches 645 or the linear potentiometer 635 to output signals to the electronic controller 1450 which, in turn, adjusts or actuates cutting dies 730 (FIG. 11) disposed within die holders 46, 146, 246 to extend or retract the dies within the die holders 46, 146, 246 depending on the detected pipe size. In other embodiments of the chuck sensing system 600, the system 600 can communicate with the motor 22, 122, 222 to adjust the speed of the motor 22, 122, 222 in response to the detected pipe size. In other embodiments of the chuck sensing system 600, the user can manually enter the pipe size on a user display panel 1350 (FIG. 19A) electrically connected to the portable pipe threader 10, 110, 210, 310.

Figure 11:
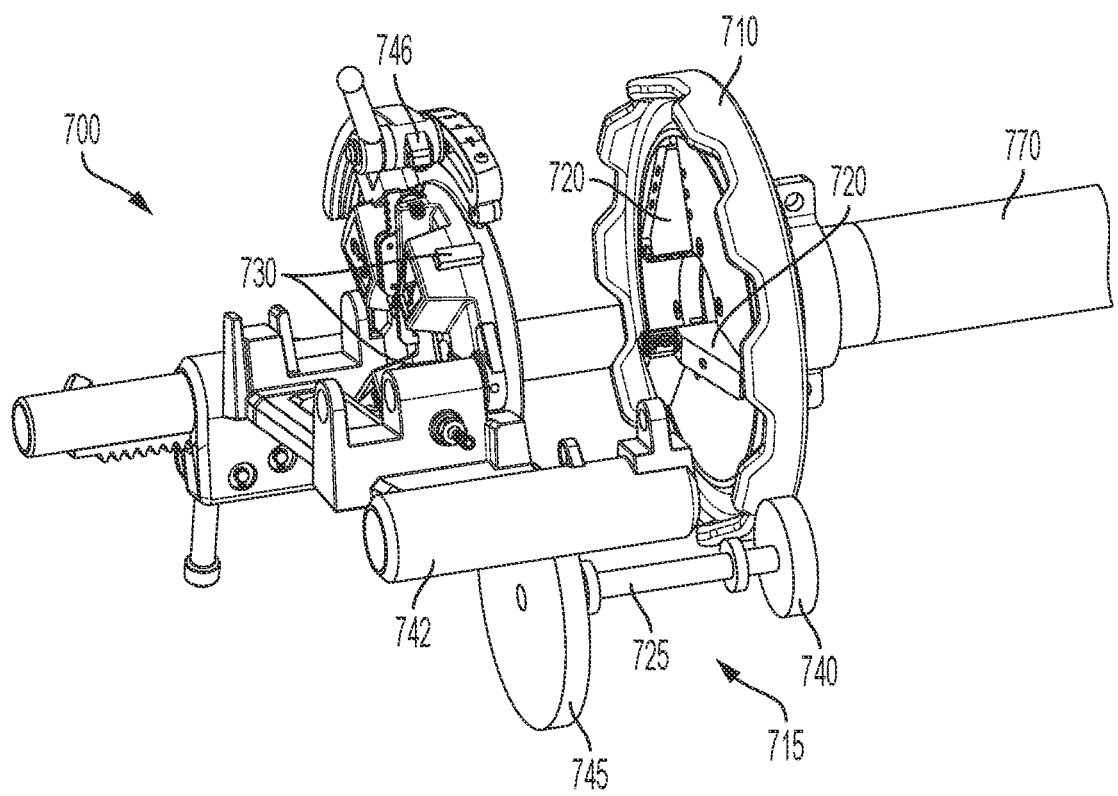
FIG. 11 is a perspective view of an embodiment of a self-adjusting die head system for use with any of the portable pipe threaders of FIGS. 1-3.
Figure 12:
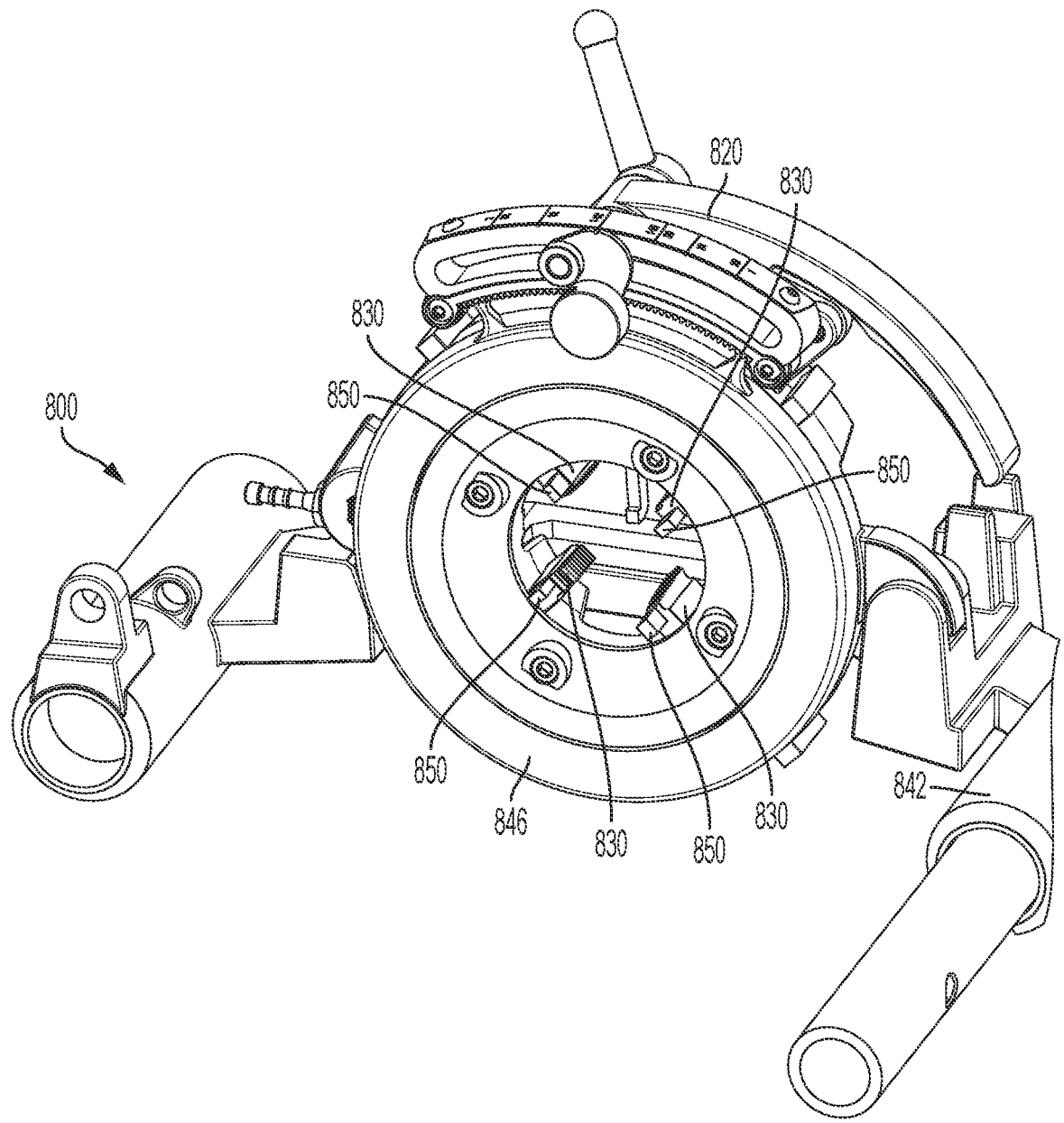
FIG. 12 is a front view of another embodiment of the self-adjusting die head system of FIG. 15.

FIGS. 11 and 12 illustrate a self-adjusting die head system 700, 800 that can be included in some embodiments of the portable pipe threaders 10, 110, 210. FIG. 11 illustrates a first embodiment of the self-adjusting die head system 700 including a chuck 710 having a plurality of chuck jaws 720 and a tooth portion engaged with a torque transfer assembly 715. The torque transfer assembly 715 includes a jackshaft 725 having a chuck output gear 740 rotatably driven by the chuck 710 and a die head input gear 745 coupled to the jackshaft 725 opposite the output gear 715 configured to be rotatably driven by the chuck output gear 715. The system 700 further includes a carriage 742 for supporting a die head 746 opposite the chuck 710 and the torque transfer assembly 715. The die head 746 includes a plurality of cutting dies 730 and a toothed portion for rotatably coupling the die head 746 to the input gear 745. In operation, the user places a pipe 14, 114, 214 into through the chuck 710 and the die head 746 and into a drive tube 770 such that the pipe is rotatably supported by the drive tube 770. Next, the user rotates the chuck 710 to tighten the chuck jaws 720 around the outer diameter of the pipe. In response to the rotation of the chuck 710, the tooth portion of the chuck 710 begins to rotate, transferring torque to the die head 746 via the torque transfer assembly 715 to adjust the dies 730 to the same radial position corresponding to the chuck jaws 720. In other words, the chuck jaws 720 and the dies 730 automatically adjust at the same time to nominally the same position. In other embodiments of the system 700, the torque transfer assembly 715 can be automated by a separate motor other than the motor 22, 122, 222.

FIG. 12 illustrates another embodiment of a self-adjusting die head system 800. The system 800 includes a die head 846 supported on a carriage 842 having a plurality of cutting dies 830 with feelers 850, and a lever 820 disposed on the die head 846 that is moveable from a first position to a second position, or vice versa. The feelers 850 touch an outer diameter of a pipe 14, 114, 214 to determine a pipe size. In operation, the user inserts the pipe into the die head 845, moves the lever 820 from the first position to the second position, thereby lowering the feelers 850 onto the outer diameter of the pipe to determine the pipe size. Next, the user sets the position of the cutting dies 830 corresponding to the determined pipe size and moves the lever 820 from the second position to the first position, retracting the feelers 850.

With reference to FIG. 12, in some embodiments of the self-adjusting die head system 800, the dies 830 automatically release the pipe 14, 114, 214 upon completion of a threading operation.

Figure 13:
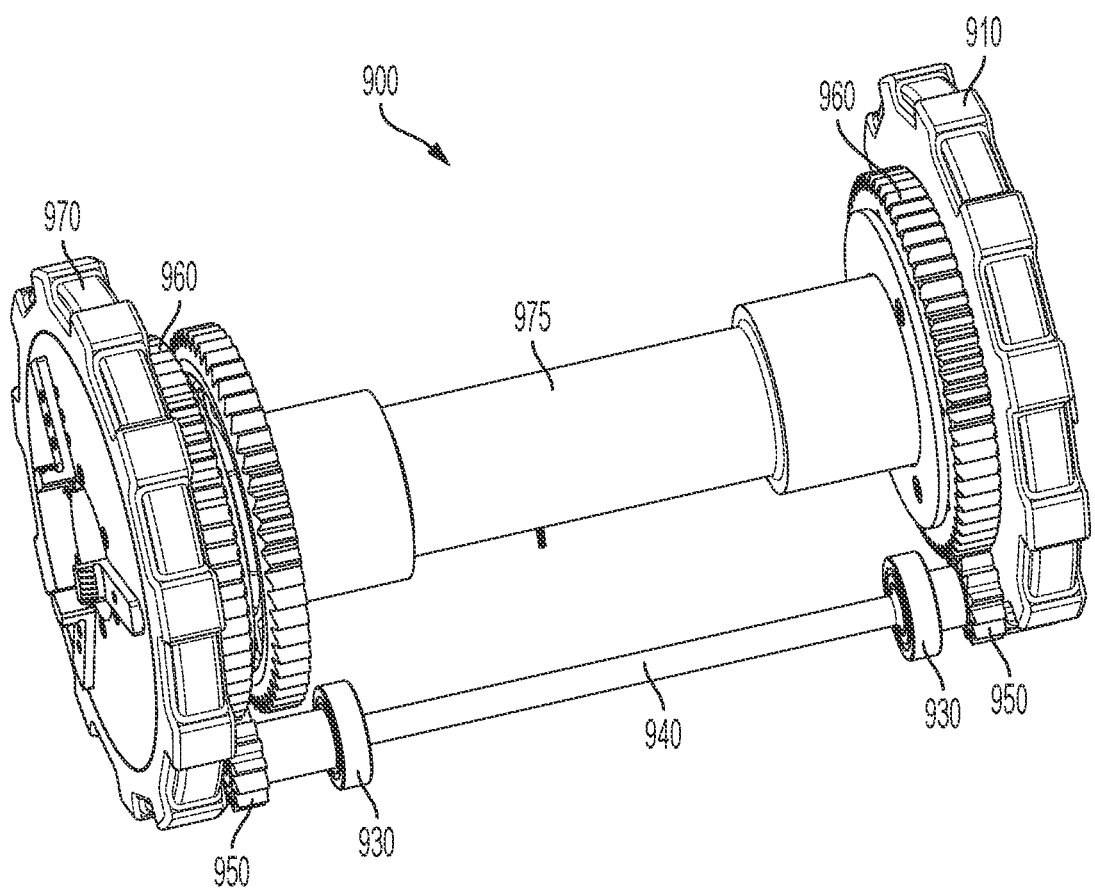
FIG. 13 is a perspective view of a chuck tightening system for use with any of the portable pipe threaders of FIGS. 1-3.
Figure 14:
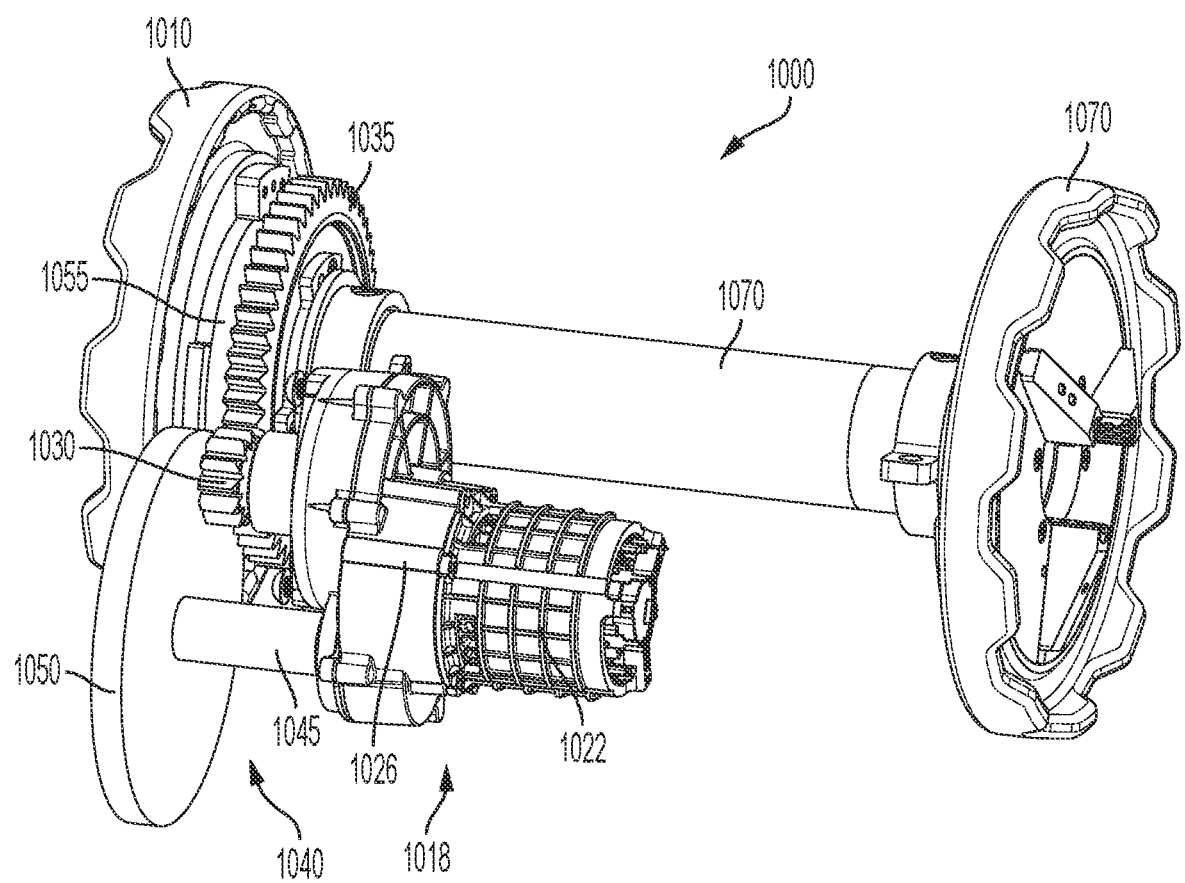
FIG. 14 is a perspective view of an automatic chucking system for use with any of the portable pipe threaders of FIGS. 1-3.

FIGS. 13 and 14 illustrate a chuck tightening system 900, 1000 that can be incorporated into some embodiments of the portable pipe threaders 10, 110, 210, 310. FIG. 14 illustrates the chuck tightening system 900 including a first chuck 910, a second chuck 970, spaced from the first chuck 910, a drive tube 975 rotatably coupling both chucks 910, 970, and a chuck drive shaft 940 having first and second pinions 950 to rotatably drive each of the chucks 910, 970. The system 900 further includes first and second ring gears 960 corresponding to each of the chucks 910, 970 that are rotatably driven by the respective first and second pinions 950, and first and second bearings 930 rotatably supporting the chuck drive shaft 940 corresponding to the first and second chucks 910, 970. The chuck drive shaft 940 can be driven by a motor 22 (FIG. 1), and selectively actuated via a pedal 30 (FIG. 1). In operation, the user can insert a pipe 14, 114, 214, 314 into the chucks 910, 970. Next, the user can depress the pedal 30, which activates the motor 22 and rotates the chuck drive shaft 940. The respective first and second pinions 950 are also rotated, which rotatably drive the first and second ring gears 960 and clamp both the chucks 910, 970 down onto the pipe at the same time.

In some embodiments of the chuck tightening system 900, the motor 22 can be the same motor 22 that rotatably drives the pipe. Additionally, in other embodiments, the chucks 910, 970 can be centrifugal chucks that clamp down on the pipe in response to the rotation of the pipe.

In other embodiments of the chuck tightening system 900, the system 900 can include a slip ring (not shown). The slip ring can be configured to transfer the torque from the motor 22 from closing the chucks 910, 970 to rotating the pipe when the chucks 910, 970 are fully closed. The slip ring can be further configured to transfer the torque from the motor 22 from rotating the pipe to opening the chucks 910, 970.

FIG. 14 illustrates another embodiment of a chuck tightening system 1000. The system 1000 includes a first chuck 1010, a second chuck 1070 spaced from the first chuck 1010, a drive assembly 1018 for rotatably driving the first chuck 1010, and a motor 1022 for providing torque to the drive assembly 1018. The drive assembly 1018 further includes a gearbox 1026 having a mechanical clutch and an output gear 1030 for powering a main drive 1035 rotatably coupled to the first chuck 1010, and a chuck tightening drive system 1040 having a chuck drive shaft 1045 with a chuck tightening gear 1050 for engaging a chuck tightening drive 1055 rotatably coupled to the first chuck 1010. The main drive 1035 and/or the chuck tightening drive 1055 can be driven by the motor 1022, and selectively actuated via a pedal 30 (FIG. 1). In operation, the user can insert a pipe 14, 114, 214, 314 into the chucks 1010, 1070 and through a drive tube 1070. Next, the user can depress the pedal 30, which activates the motor 1022 and rotates the chuck main drive 1035. To automatically tighten the chucks 1010, 1070 onto the outer diameter of the pipe, the user selects an auto-tightening mode on the user interface 1350 and actuates the pedal 30, which moves the clutch into engagement with the chuck drive shaft 1045 to rotatably power the chuck tightening gear 1050, and subsequently the chuck tightening drive 1055, which automatically clamps the pipe in the chucks 1010, 1070. After the pipe is clamped within the chucks 1010, 1070, the clutch automatically disengages from the chuck shaft 1045 and resumes rotating the main drive 1035.

Figure 15:
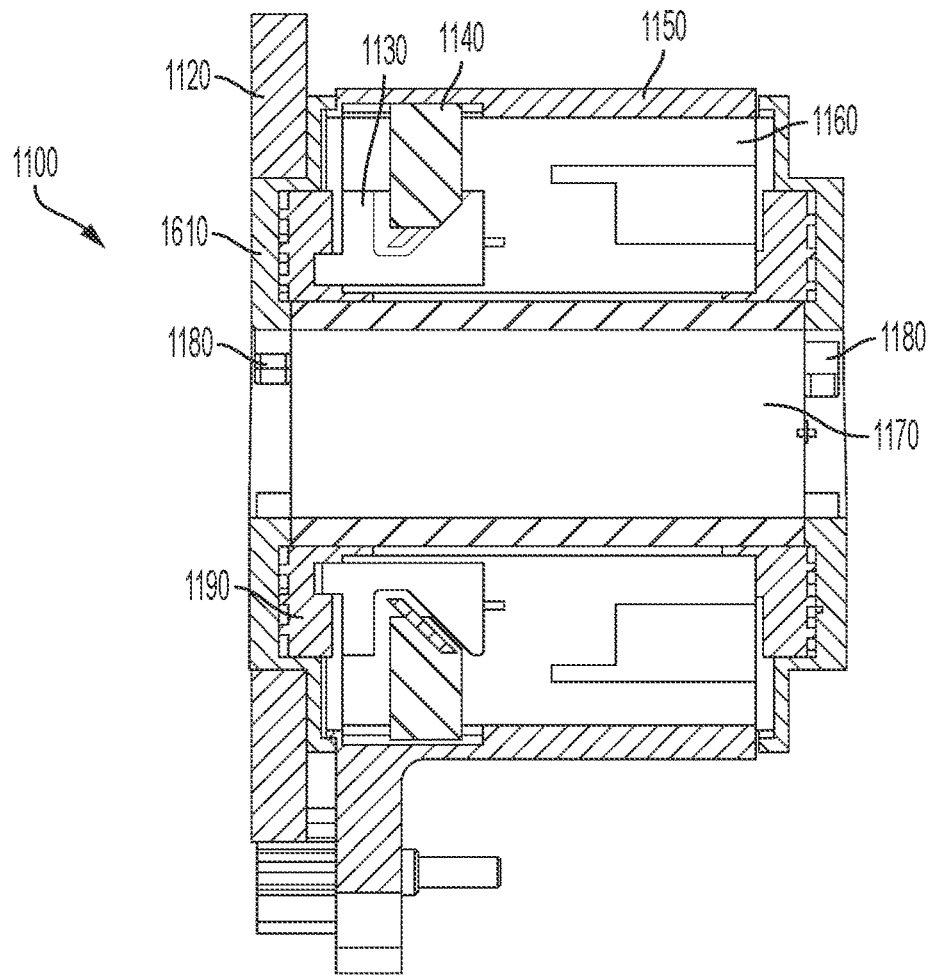
FIG. 15 is a side view of another embodiment of the automatic chucking system for use with any of the portable pipe threaders FIGS. 1-3.
Figure 16:
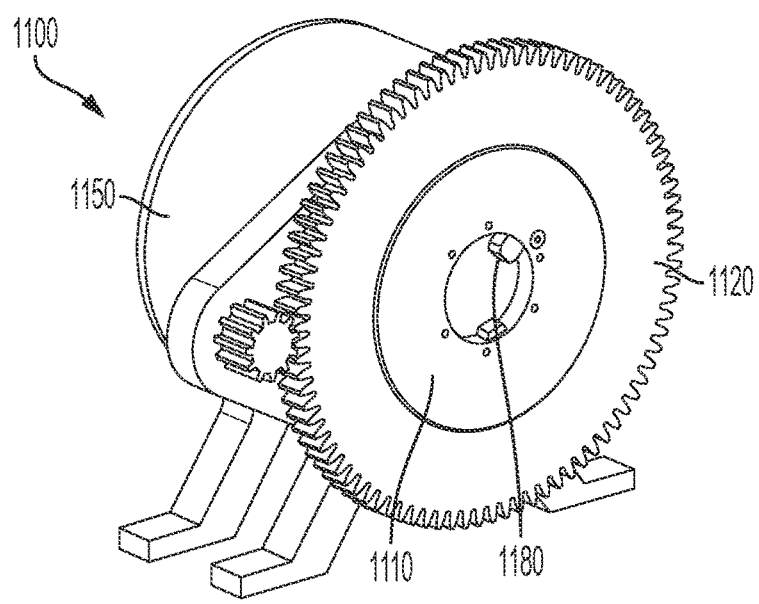
FIG. 16 is a perspective view of the automatic chucking system of FIG. 15.

FIGS. 15 and 16 illustrate an automatic pipe chucking system 1100 that can be incorporated into some embodiments of the portable pipe threaders 10, 110, 210, 310. The automatic pipe chucking system 1100 includes a housing 1150 having a jaw plate 1110 with a plurality of jaws 1180 located at a front part and a rear part of the housing 1150, a driven gear 1120 surrounding the jaw plate 1110 configured to drive the jaw plate 1110 via a motor 22 (FIG. 1), and a scroll plate 1190 abutting the jaw plate and held in place by a ramp pin housing 1160 having a plurality of ramp pins 1130 and a plurality of engagement keys 1140 coupled to the ramp pins 1130. The ramp pins 1130 are arranged to create a frictional force between the ramp pins 1130 and the scroll plate 1190. The housing 1150 of the chucking system 1100 further includes a drive tube 1170 coupled to the scroll plate 1190 and extending between the front portion of the housing 1150 and the rear portion of the housing 1150. The drive tube 1170 is configured to receive a pipe 14, 114, 214 therein between the jaws 1180.

During operation of the automatic pipe chucking system 1100, a user inserts the pipe 14, 114, 214 through the drive tube 1170, actuates the motor 22, which drives the driven gear 1120, causing the jaw plate 1110 to begin rotating and extend the jaws 1180 toward an outer dimeter of the pipe. Once the jaws 1180 contact the outer diameter of the pipe, the scroll plate 1190 begins to co-rotate with the jaw plate 1110, therefore overcoming the frictional force generated between the ramp pins 1130 and the scroll plate 1190. As the scroll plate 1190 begins to rotate, the scroll plate 1190 pushes the ramp pins 1130 into the ramp pin housing 1160, thereby pulling the engagement keys 1140 into the ramp pin housing 1160, disengaging the ramp pin housing 1160 from the main tool housing 1150, and automatically chucking the pipe.

In some embodiments of the automatic pipe chucking system 1100, the ramp pins 1130 can include a ramp angle configured to control the frictional force between the scroll plate 1190 and the ramp pins 1130. The ramp angle corresponds to a threshold torque required to be overcome by the scroll plate 1190 before it can co-rotate with the jaw plate 1110. In other embodiments, a return spring force from the ramp pins 1130 can determine the threshold torque.

In some embodiments, reversing the drive direction of the motor reverses the driven gear 1120, causing the jaws 1180 to retract from the outer diameter of the pipe. In other embodiments, the jaws 1180 located at front portion and the rear portion of the housing 1150 are extended or retracted simultaneously by the drive tube 1170. In other embodiments, the automatic chucking system 1100 can have a positive effect on battery run time of the battery pack 38 (FIG. 1) compared to other conventional automatic chucking systems.

FIGS. 17A-17D illustrate a stand 1200 that can be used to support the threader 10, 110, 210, 310. The stand 1200 includes a table portion 1215 having a plurality of mounts to which the threader 10, 110, 210, 310 is secured and an upright support 1217 on which a locking mechanism 1220 is located. The stand 1200 further includes a plurality of first and second support legs 1210, 1260 pivotably coupled to each other via rotatable joints 1270 (e.g., bolts, screws, etc.), an axle 1265 pivotably coupled to the second support legs 1260 having a plurality of wheels 1230, and a handle assembly 1235 integrated with the first support legs 1210. In a deployed state (FIGS. 17A and 17D), where the threader 10, 110, 210, 310 is elevated from a work surface 1205 and in use, the handle assembly 1235 and the wheels 1230 support the threader 10, 110, 210, 310 on the work surface 1205.

Figure 17A:
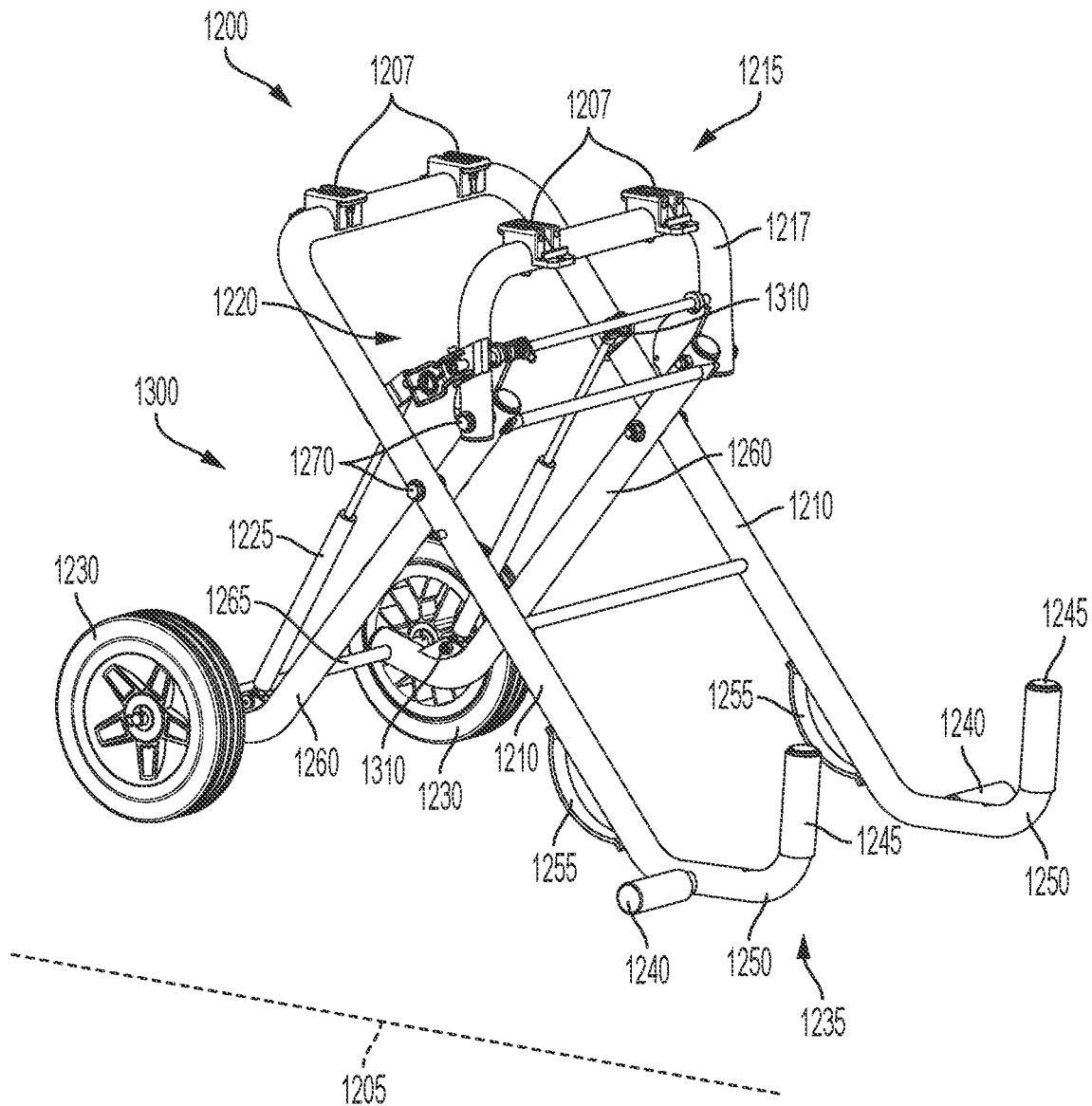
FIG. 17A is a perspective view of a stand for use with any of the portable pipe threaders of FIGS. 1-3.

The handle assembly 1235 includes a plurality of different gripping positions 1240, 1245, 1250 for the user to grasp the stand 1200 during transport of the threader, and loading skis 1255 coupled to the first support legs 1210 for allowing the stand 1200 to more easily travel over surfaces when it is being transported (e.g., being pulled up stairs). In other instances, the loading skis 1255 can space the stand 1200 from the work surface 1205 at a level that can provide the user with more room to grasp the various gripping portions 1240, 1245, 1250, while maintaining contact with the work surface 1205. The first gripping portion 1240 doubles as feet to support the stand 1200 when it is in the deployed state (FIGS. 17A and 17D). The second gripping portion 1245 is raised off the work surface 1205 such that the user doesn't have to bend down all the way to the surface 1205 in order to grasp the gripping portion 1245 when lifting the stand 1200. Additionally, the second gripping portion 1245 is useful when transporting the stand 1200 over rough surfaces (e.g., gravel, dirt, etc.) because the second gripping portion 1245 creates a low angle between the stand 1200 and the work surface 1205, which transfers the weight of threader 10, 110, 210, 310 to the user rather than the stand 1200, allowing the user to traverse obstacles much easier. The third gripping portion 1250 benefits the user as it allows them to tip the threader 10, 110, 210, 310 at a larger angle with respect to the work surface 1205 when transporting the stand 1200, which allows them to more easily balance the threader 10, 110, 210, 310 during transport. Similarly, when the user is transporting the stand 1200 on flat surfaces, the third gripping portion 1250 allows the user to shift the weight of the threader 10, 110, 210, 310 over the wheels 1230 rather than the user, which allows for easier transport on flat surfaces. To aid the user in grasping any one of the gripping portions 1240, 1245, 1250, the loading skis 1255 can be utilized as they main constant contact with the work surface 1205 to maintain the handle assembly 1235 spaced from the work surface 1205 to In some embodiments of the stand 1200, the third gripping portion 1250 can include anchoring bolt holes 1251 (FIG. 19A) so the stand 1200 can be bolted to the work surface 1205 to prevent the stand 1200 from tipping over when heavy pipes 14, 114, 214, 314 or other accessories are mounted to the threader 10, 110, 210, 310.

Figure 17B:
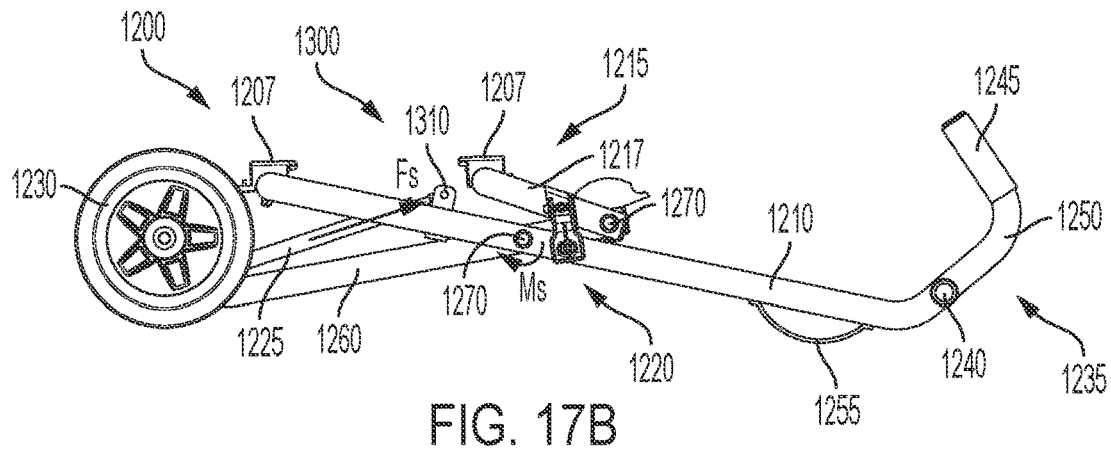
FIGS. 17B-D are side view of the stand progressively moving from a collapsed state to a deployed state.
Figure 17C:
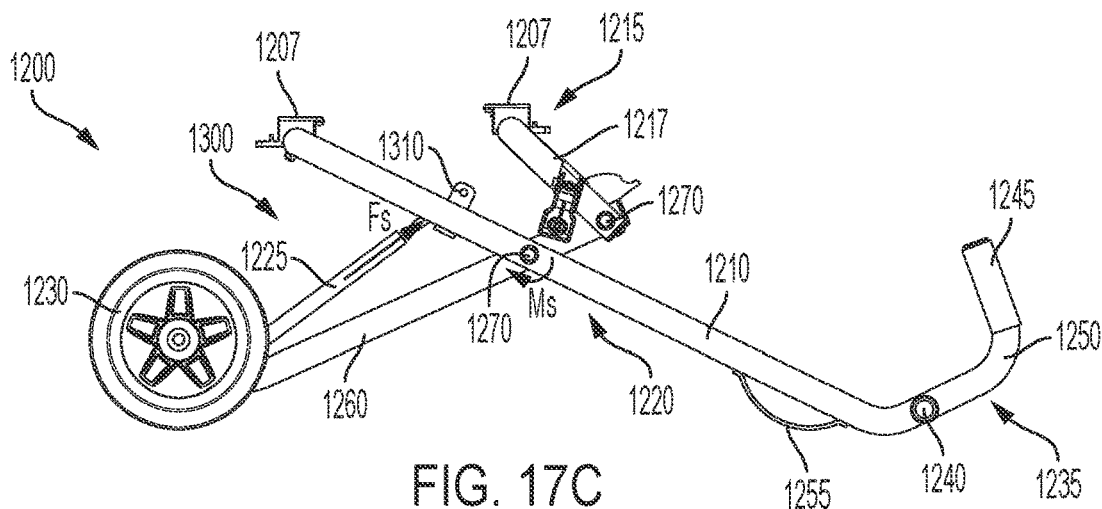
Figure 17D:
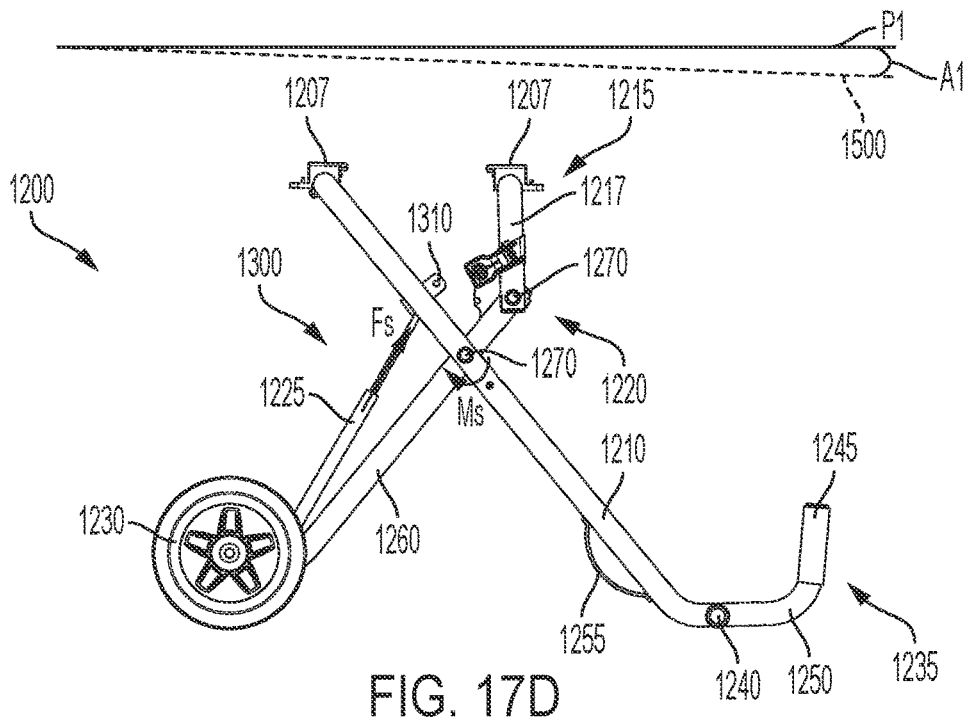

FIGS. 17B-17D illustrate a gradual progression of the stand 1200 from its collapsed, travel state (FIG. 17B) to its deployed, in-use state (FIG. 17D) with the assist of a lift assist mechanism 1300. The lift assist mechanism 1300 includes a plurality of gas-assist springs 1225 including a first end coupled to the first support legs 120 and a second end coupled to the second support legs 1260 via a plurality of support pins 1310. Each of the gas springs 1225 extend along a longitudinal axis that is oriented perpendicular to and offset from a pivot axis about the rotatable joint 1270. The gas springs 1225 are configured to continually bias the stand 1200 to its deployed state (FIG. 17D) by imparting forces $F_s$ (one for each spring 1225) in-line with each of the spring 1225 to create a moment $M_s$ about the rotatable joint 1270 between the pairs of legs 1210, 1260 to continually bias the stand 1200 to the deployed position. By having the springs 1225 continually bias the stand 1200 toward the deployed state, this reduces the need for the user to manually lift the stand 1200, and subsequently the threader 10, 110, 210, 310 into its deployed state. In some embodiments of the lift assist mechanism 1300, the gas springs 1225 can be calibrated to reduce the deployment lift weight of the threader 10, 110, 210, 310 to less than 10 lbs.

Figure 18A:
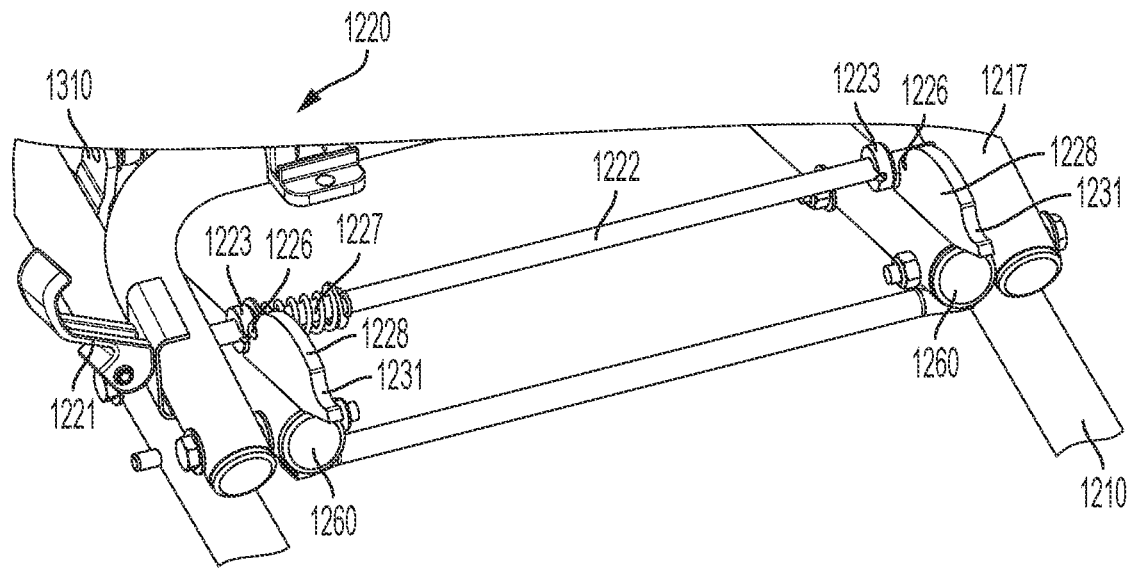
FIGS. 18A-18B are perspective views of a locking mechanism for use with the stand of FIG. 17A.
Figure 18B:
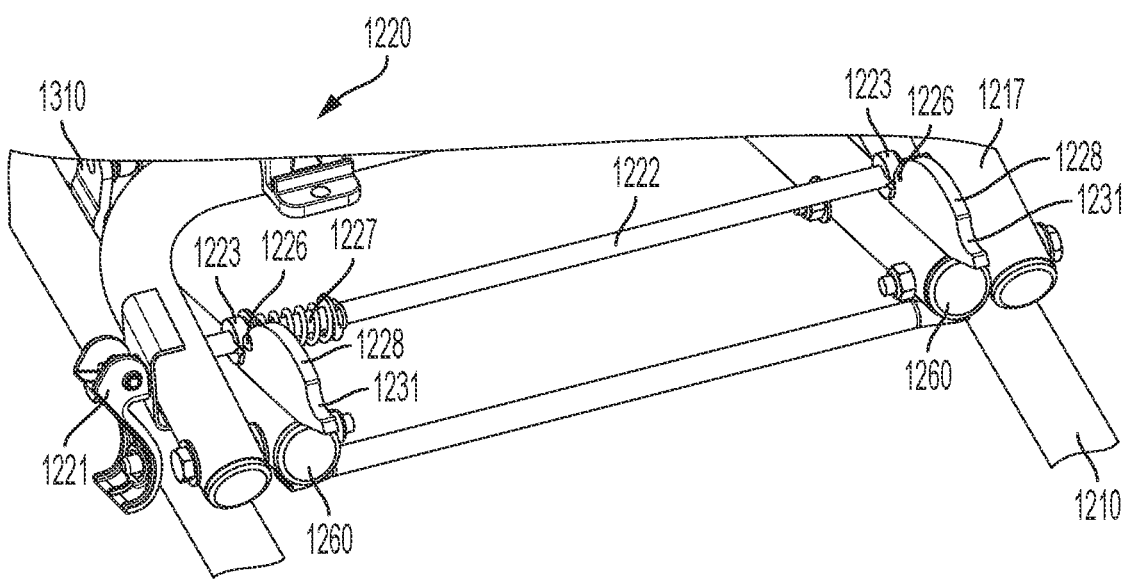
Figure 18C:
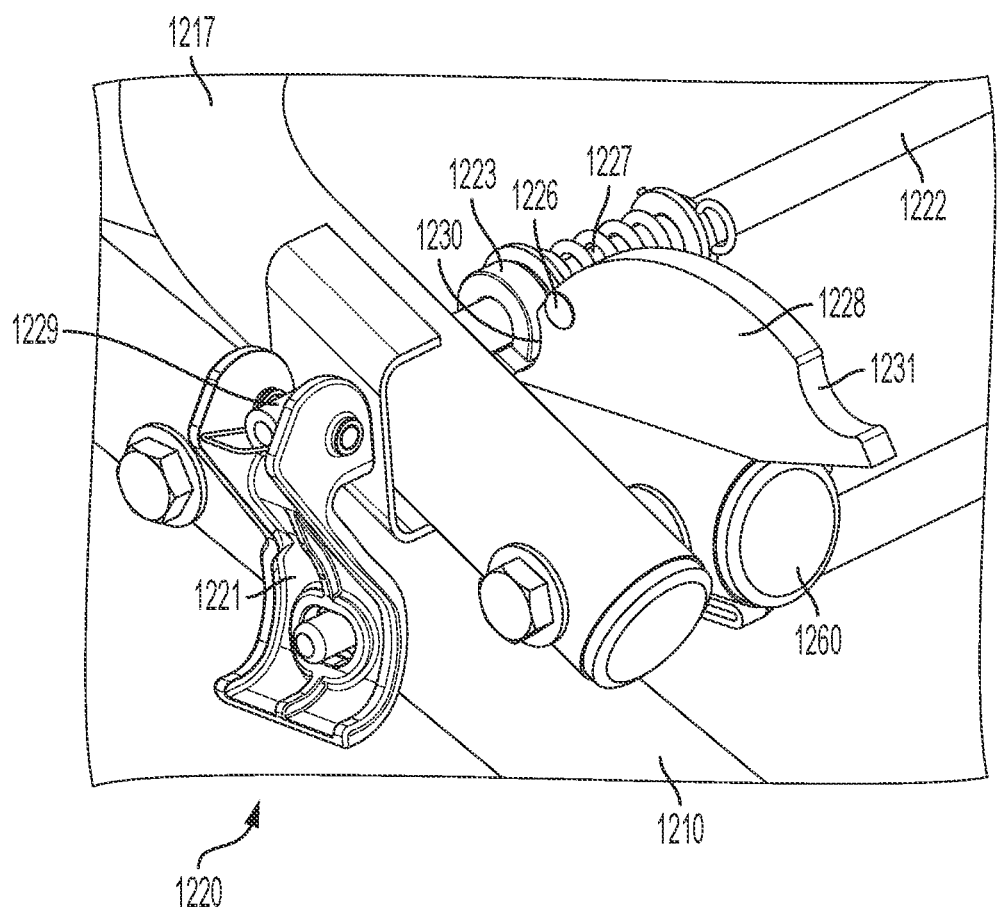
FIG. 18C is a zoomed-in perspective view of the locking mechanism of FIGS. 18A-18B.

With continued reference to FIGS. 17A-17D, and reference to FIGS. 18A-18C, to selectively lock the stand 1200 in the deployed or collapsed states, the stand 1200 includes a lock mechanism 1220. FIG. 18A illustrates the lock mechanism 1220 in an unlocked position. The lock mechanism 1220 includes a cam handle 1221 pivotably mounted on the upright support 1217 having a torsion spring 1229 (FIG. 18C) for biasing the handle 1221 toward the locked position, a support rod 1222 coupled to the cam handle 1221 and extending between the upright support 1217 having a plurality of lock bushings 1223 disposed on either side of the support rod 1222, a lock bracket 1228 mounted on each of the second support legs 1260 and (one of which) having a rivet head 1226 laterally protruding from a side of the bracket 1228 facing the cam handle 1221, and a compression spring 1227 located on the support rod 1222 adjacent the cam handle 1221 side of the support rod 1222 for biasing the bushings 1223 into selective engagement with the lock brackets 1228. Each lock bracket 1228 includes a first recess 1230 (FIG. 18C) in which the bushing 1223 is received when the stand 1200 is in the collapsed state and a second recess 1231 in which the bushing 1223 is received when the stand 1200 is in the deployed state.

To selectively lock the stand 1200 in either the deployed or collapsed states, the user first rotates the cam handle 1221 upward (into the position shown in FIG. 18A) into a release position. When the handle 1221 is pivoted to the release position, the bushing 1223 laterally slides out of engagement with the first recess 1230. However, the bushing 1223 is not moved far enough to clear the rivet head 1226. Therefore, as the stand 1200 is adjusted from the collapsed state toward the deployed state, the bushing 1223 slides over the rivet head 1226, which functions as a cam surface to further displace the bushing 1223 and the attached rod 1222 in the direction of the cam handle 1221, thereby releasing the friction between the cam handle 1221 and the upright 1217, permitting the torsion spring 1229 to return the cam handle 1221 to its locking position prior to the bushing 1223 reaching the second recess 1231. Then, when the bushing 1223 reaches the second recess 1231, the spring 1227 rebounds, pushing the rod 1222 and the attached bushings 1223 away from the cam handle 1221 and into the second recess 1230 to lock the stand 1200 into the deployed state. Likewise, the same process happens in reverse, when adjusting the stand 1200 from the deployed state to the collapsed state. When transporting the stand 1200 in the collapsed state, it is advantageous to keep the stand 1200 in the locked position (FIG. 18B), as the locking mechanism 1220 prevents the stand 1200 from lurching unexpectedly forward during transport.

Figure 19A:
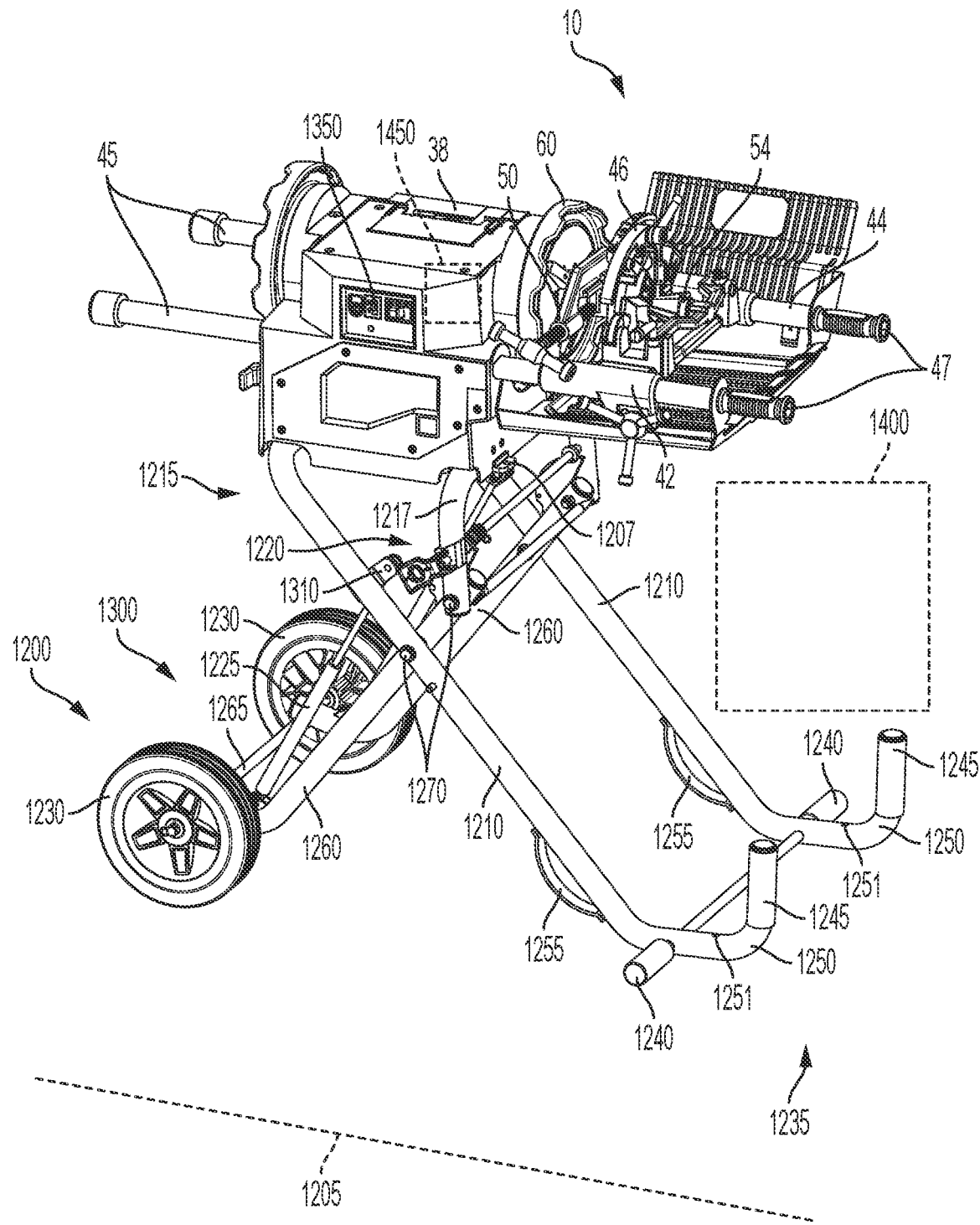
FIG. 19A is a perspective view of the stand of FIG. 17A in a deployed position for use with for use with any of the portable pipe threaders of FIGS. 1-3.
Figure 19B:
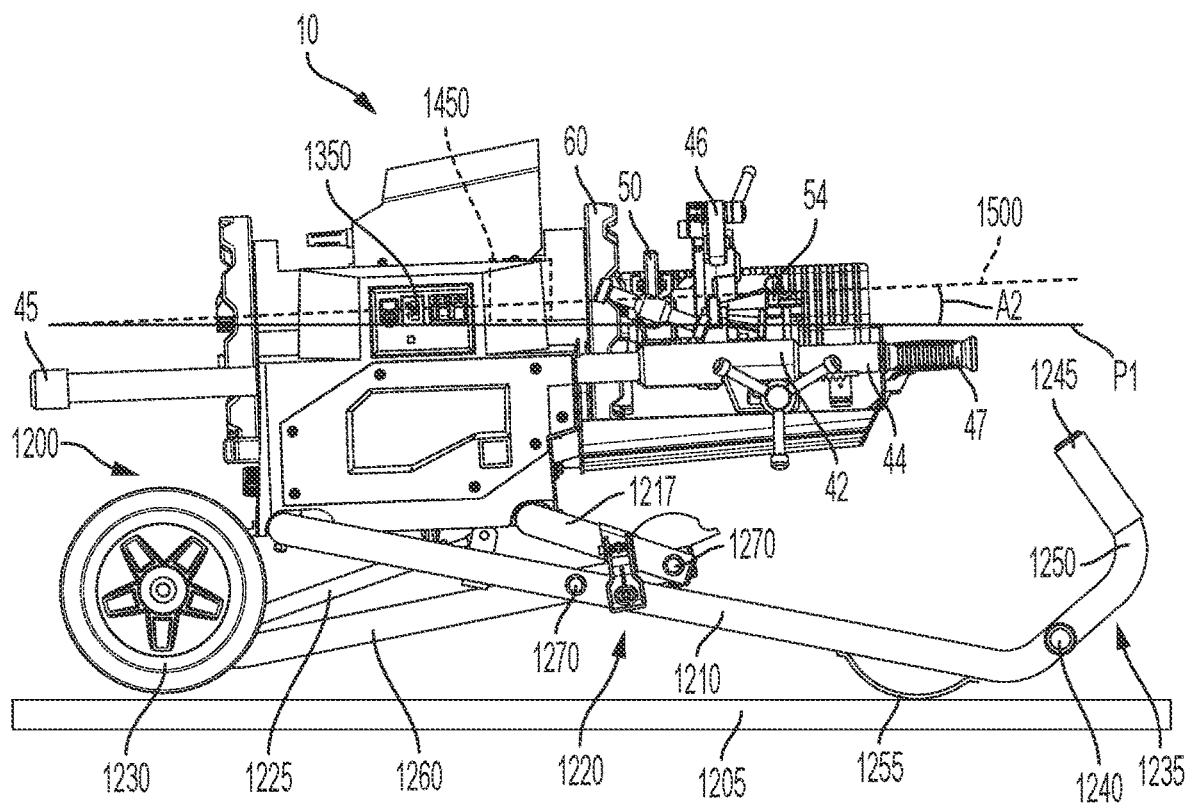
FIG. 19B is a perspective view of the stand of FIG. 17A in a collapsed position for use with for use with any of the portable pipe threaders of FIGS. 1-3.

FIGS. 19A and 19B illustrate one embodiment of the threader 10 mounted on the stand 1200. FIG. 19A illustrates the threader 10 in the deployed, in-use state elevated above the work surface 1205. In this state, the user can utilize a zone 1400 positioned below the first set of guide rails 44 free from obstruction allowing the user to selectively mount the carriage 42 including the plurality of pipe threading tools 46, 50, 54, or any other type of accessory, such as a roll-groover. Additionally, the zone 1400 can provide an open space between the handles 47 such that the user can stand between the handles 47 when transporting the threader 10.

FIG. 19B illustrates one embodiment of the threader 10 mounted on the stand 1200 in the collapsed, transport state adjacent the work surface 1205. In the collapsed state, the second set of guide rails 45 can double as lift points for the user to lift the stand 1200 up and over obstacles. In addition, the second set of guide rails 45 can be configured as support posts that contact the work surface 1205 such that the threader 10 can be stored in a vertical, upright position by a combination of the guide rails 45 and the wheels 1230. Furthermore, in the deployed state, the mounting brackets 1207 are configured to incline the main housing 51 slightly forward along a spindle axis 1500 at an angle A1 with respect to a reference plane P1 (FIG. 17D), with the pipe threading tools 46, 50, 54 being at a lower elevation than the spindle 60, to permit lubricant to flow away from the pipe 14, 114, 214 as work is being performed. In some embodiments, the angle A1 is 1°-2°. Alternatively, in the collapsed state, the main housing 51 is inclined slightly rearward along the spindle axis 1500 at an angle A2 with respect to the reference plane P1, with the pipe threading tools 46, 50, 54 being at a higher elevation than the spindle 60, to promote drainage of the lubrication system 300 when the system 300 is integrated with the threader 10. In some embodiments, the angle A2 is 1°-2°.

Various features of the invention are set forth in the following claims.

What is claimed is:

1. A portable pipe threader comprising:
    a stand upon which a pipe is supported;
    a housing having a set of guide rails extending from an end of the housing and a battery receptacle recessed within the housing;
    a carriage supported by the guide rails, the carriage supporting at least one pipe threading tool;
    a spindle including a plurality of chuck jaws for clamping the pipe, the chuck jaws configured to move radially inward along a travel path toward an outer surface of the pipe;
    a sensor system configured to determine a location of the chuck jaws along the travel path and relative to the outer surface of the pipe, the sensor system configured to output a signal corresponding to the location of each of the chuck jaws when engaged with the outer surface of the pipe;
    a die head supported on the carriage, the die head including a plurality of cutting dies and a toothed portion; and
    an electronic controller in communication with the sensor system, wherein, in response to the signal output from the sensor system, the electronic controller is configured to determine an outer diameter of the pipe and actuate a single motor to drive an input gear coupled to the toothed portion of the die head to extend or retract the plurality of cutting dies at the same time to a same radial position depending on the outer diameter of the pipe, wherein the plurality of cutting dies do not operate independent of each other.

2. The portable pipe threader of claim 1, further comprising:
    a reamer and a cutter coupled to the carriage and selectively operable to perform work on the pipe;
    a drive assembly mounted to the stand including a brushless direct current electric motor operable to provide torque to the pipe; and
    a battery pack slidably received within the battery receptacle and in selective electrical communication with the motor to provide electrical power to the motor.

3. The portable pipe threader of claim 2, wherein the electronic controller is further configured to adjust the reamer, the cutter, or a combination thereof in response to the signal output from the sensor system.

4. The portable pipe threader of claim 1, wherein the sensor system comprises a plurality of sensors mounted on the spindle in the travel path of the chuck jaws, the plurality of sensors being configured to determine a position of the chuck jaws along the travel path depending on a number of one of the plurality of sensors being covered by the respective jaws.

5. The portable pipe threader of claim 4, wherein, depending on the number of the sensors that are covered by the jaws, the sensor system is configured to electrically communicate with the electronic controller to determine a nominal measured size of an outer diameter of the pipe.

6. The portable pipe threader of claim 1, wherein the sensor system comprises a linear potentiometer or a proximity sensor mounted on an outermost radial position on the travel path of the chuck jaws configured to determine a radial position of the chuck jaws along the travel path relative to an outer diameter of the pipe.

7. The portable pipe threader of claim 1, wherein the sensor system comprises a plurality of switches mounted on the spindle in the travel path of one of the chuck jaws, the plurality of switches being configured to determine a position of the chuck jaws along the travel path depending on a number of one of the plurality of switches being depressed by one of the respective chuck jaws.

* * * * *